United States Patent
Agrawal et al.

(10) Patent No.: US 8,102,832 B2
(45) Date of Patent: Jan. 24, 2012

(54) FAST FREQUENCY HOPPING WITH A CODE DIVISION MULTIPLEXED PILOT IN AN OFDMA SYSTEM

(75) Inventors: Avneesh Agrawal, San Diego, CA (US); Edward Harrison Teague, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 11/614,470

(22) Filed: Dec. 21, 2006

(65) Prior Publication Data

US 2007/0211790 A1    Sep. 13, 2007

Related U.S. Application Data

(63) Continuation of application No. 10/726,944, filed on Dec. 3, 2003, now Pat. No. 7,177,297.

(60) Provisional application No. 60/470,107, filed on May 12, 2003.

(51) Int. Cl.
*H04B 7/216* (2006.01)

(52) U.S. Cl. ........ 370/342; 370/343; 370/345; 370/335; 370/328

(58) Field of Classification Search ............ 370/342, 370/345, 341, 335, 347, 324, 328, 331, 343, 370/377; 375/377
See application file for complete search history.

(56) References Cited

U.S. PATENT DOCUMENTS

| | | |
|---|---|---|
| 4,346,473 A | 8/1982 | Davis |
| 4,617,657 A | 10/1986 | Drynan et al. |
| 4,850,036 A | 7/1989 | Smith |
| 5,282,222 A | 1/1994 | Fattouche et al. |
| 5,408,496 A | 4/1995 | Ritz et al. |
| 5,416,780 A | 5/1995 | Patel et al. |
| 5,511,233 A | 4/1996 | Otten |
| 5,519,730 A * | 5/1996 | Jasper et al. ............ 375/260 |

(Continued)

FOREIGN PATENT DOCUMENTS

CN    1394394 A    1/2003

(Continued)

OTHER PUBLICATIONS

International Search Report—Internatioinal Search Authority—United States Patent Office PCT/US04/014453 Jan. 11, 2006.

(Continued)

*Primary Examiner* — Chuong T Ho
(74) *Attorney, Agent, or Firm* — Stanton Braden

(57) ABSTRACT

Techniques are provided to support fast frequency hopping with a code division multiplexed (CDM) pilot in a multi-carrier communication system (e.g., an OFDMA system). Each transmitter (e.g., each terminal) in the system transmits a wideband pilot on all subbands to allow a receiver (e.g., a base station) to estimate the entire channel response at the same time. The wideband pilot for each transmitter may be generated using direct sequence spread spectrum processing and based on a pseudo-random number (PN) code assigned to that transmitter. This allows the receiver to individually identify and recover multiple wideband pilots transmitted concurrently by multiple transmitters. For a time division multiplexed (TDM)/CDM pilot transmission scheme, each transmitter transmits the wideband pilot in bursts. For a continuous CDM pilot transmission scheme, each transmitter continuously transmits the wideband pilot, albeit at a low transmit power level. Any frequency hopping rate may be supported without impacting pilot overhead.

10 Claims, 11 Drawing Sheets

U.S. PATENT DOCUMENTS

| | | |
|---|---|---|
| 5,694,389 A | 12/1997 | Seki et al. |
| 5,732,351 A | 3/1998 | Olds et al. |
| 5,822,700 A | 10/1998 | Hult et al. |
| 5,867,478 A | 2/1999 | Baum et al. |
| 5,889,759 A | 3/1999 | McGibney |
| 5,920,547 A | 7/1999 | Werth |
| 5,995,494 A | 11/1999 | Horikawa |
| 6,005,852 A | 12/1999 | Kokko et al. |
| 6,021,124 A | 2/2000 | Haartsen et al. |
| 6,052,377 A | 4/2000 | Ohmi et al. |
| 6,104,926 A | 8/2000 | Hogg et al. |
| 6,105,064 A | 8/2000 | Davis et al. |
| 6,134,434 A | 10/2000 | Krishnamurthi et al. |
| 6,141,550 A | 10/2000 | Ayabe et al. |
| 6,157,839 A | 12/2000 | Cerwall et al. |
| 6,172,971 B1 | 1/2001 | Kim |
| 6,173,016 B1 | 1/2001 | Suzuki |
| 6,188,717 B1 | 2/2001 | Kaiser et al. |
| 6,263,205 B1 | 7/2001 | Yamaura et al. |
| 6,285,665 B1 | 9/2001 | Chuah |
| 6,333,937 B1 | 12/2001 | Ryan et al. |
| 6,347,091 B1 | 2/2002 | Wallentin et al. |
| 6,367,045 B1 | 4/2002 | Khan et al. |
| 6,369,758 B1 | 4/2002 | Zhang |
| 6,377,809 B1 | 4/2002 | Rezaiifar et al. |
| 6,430,412 B1 | 8/2002 | Hogg et al. |
| 6,430,724 B1 | 8/2002 | Laneman et al. |
| 6,447,210 B1 | 9/2002 | Coombs et al. |
| 6,449,245 B1 | 9/2002 | Ikeda et al. |
| 6,466,591 B1 | 10/2002 | See et al. |
| 6,473,393 B1 | 10/2002 | Ariyavisitakul et al. |
| 6,477,210 B2 | 11/2002 | Chuang et al. |
| 6,487,235 B2 | 11/2002 | Hoole |
| 6,487,252 B1 | 11/2002 | Kleider et al. |
| 6,505,253 B1 | 1/2003 | Chiu et al. |
| 6,515,997 B1 | 2/2003 | Feltner et al. |
| 6,522,886 B1 | 2/2003 | Youngs et al. |
| 6,532,227 B1 | 3/2003 | Leppisaari et al. |
| 6,532,256 B2 | 3/2003 | Miller |
| 6,535,715 B2 | 3/2003 | Dapper et al. |
| 6,545,997 B1 | 4/2003 | Bohnke et al. |
| 6,549,561 B2 | 4/2003 | Crawford et al. |
| 6,563,858 B1 | 5/2003 | Fakatselis et al. |
| 6,567,374 B1 | 5/2003 | Bohnke et al. |
| 6,567,397 B1 | 5/2003 | Smigelski et al. |
| 6,594,320 B1 | 7/2003 | Sayeed |
| 6,597,680 B1 | 7/2003 | Lindskog et al. |
| 6,597,745 B1 | 7/2003 | Dowling et al. |
| 6,597,918 B1 | 7/2003 | Kim et al. |
| 6,601,207 B1 | 7/2003 | Vanttinen |
| 6,603,801 B1 | 8/2003 | Andren et al. |
| 6,618,454 B1 | 9/2003 | Agrawal et al. |
| 6,633,616 B2 | 10/2003 | Crawford et al. |
| 6,636,568 B2 | 10/2003 | Kadous et al. |
| 6,643,281 B1 | 11/2003 | Ryan |
| 6,654,429 B1 | 11/2003 | Li et al. |
| 6,658,619 B1 | 12/2003 | Chen |
| 6,661,832 B1 | 12/2003 | Sindhushayana et al. |
| 6,665,309 B1 | 12/2003 | Hsu et al. |
| 6,674,792 B1 | 1/2004 | Sugita et al. |
| 6,697,347 B2 | 2/2004 | Ostman et al. |
| 6,700,865 B1 | 3/2004 | Yamamoto et al. |
| 6,724,813 B1 | 4/2004 | Jamal et al. |
| 6,731,614 B1 | 5/2004 | Ohlson et al. |
| 6,741,634 B1 | 5/2004 | Kim et al. |
| 6,751,187 B2 | 6/2004 | Walton et al. |
| 6,801,564 B2 | 10/2004 | Rouphael et al. |
| 6,813,478 B2 | 11/2004 | Glazko et al. |
| 6,876,694 B2 | 4/2005 | Komatsu |
| 6,878,694 B2 | 4/2005 | Doshi et al. |
| 6,885,645 B2 | 4/2005 | Ryan et al. |
| 6,888,805 B2 | 5/2005 | Bender et al. |
| 6,907,246 B2 | 6/2005 | Xu et al. |
| 6,909,761 B2* | 6/2005 | Kloos et al. ............ 375/376 |
| 6,928,062 B2 | 8/2005 | Krishnan et al. |
| 6,928,065 B2 | 8/2005 | Logalbo et al. |
| 6,975,647 B2 | 12/2005 | Neale et al. |
| 6,977,974 B1 | 12/2005 | Geraniotis et al. |
| 6,990,142 B2 | 1/2006 | Chappaz et al. |
| 6,996,195 B2 | 2/2006 | Kadous et al. |
| 6,996,401 B2 | 2/2006 | Agin |
| 7,009,960 B2 | 3/2006 | Ho |
| 7,020,110 B2 | 3/2006 | Walton et al. |
| 7,027,429 B2 | 4/2006 | Laroia et al. |
| 7,027,523 B2 | 4/2006 | Jalali et al. |
| 7,039,001 B2 | 5/2006 | Krishnan et al. |
| 7,039,004 B2 | 5/2006 | Sun et al. |
| 7,042,429 B2 | 5/2006 | Miyazawa et al. |
| 7,042,857 B2 | 5/2006 | Krishnan et al. |
| 7,046,651 B2 | 5/2006 | Terry |
| 7,054,902 B2 | 5/2006 | Toporek et al. |
| 7,058,134 B2 | 6/2006 | Sampath et al. |
| 7,061,915 B2 | 6/2006 | Seidel et al. |
| 7,061,916 B2 | 6/2006 | Herron et al. |
| 7,062,276 B2 | 6/2006 | Xu et al. |
| 7,068,703 B2* | 6/2006 | Maric ............ 375/136 |
| 7,072,413 B2 | 7/2006 | Walton et al. |
| 7,089,024 B2 | 8/2006 | Kim et al. |
| 7,092,459 B2 | 8/2006 | Sendonaris et al. |
| 7,099,296 B2 | 8/2006 | Belcea |
| 7,099,299 B2 | 8/2006 | Liang et al. |
| 7,099,622 B2 | 8/2006 | Meyer et al. |
| 7,103,823 B2 | 9/2006 | Nemawarkar |
| 7,127,012 B2 | 10/2006 | Han et al. |
| 7,133,460 B2 | 11/2006 | Bae et al. |
| 7,139,320 B1 | 11/2006 | Singh et al. |
| 7,177,297 B2 | 2/2007 | Agrawal et al. |
| 7,181,170 B2 | 2/2007 | Love et al. |
| 7,254,158 B2* | 8/2007 | Agrawal ............ 375/136 |
| 7,280,467 B2* | 10/2007 | Smee et al. ............ 370/208 |
| 7,283,559 B2 | 10/2007 | Cho et al. |
| 7,310,336 B2 | 12/2007 | Malkamaki et al. |
| 7,320,043 B2 | 1/2008 | Shatas et al. |
| 7,366,272 B2 | 4/2008 | Kim et al. |
| 7,376,422 B2 | 5/2008 | Yagihashi |
| 7,411,895 B2 | 8/2008 | Laroia et al. |
| 7,430,253 B2 | 9/2008 | Olson et al. |
| 7,450,587 B2 | 11/2008 | Gruhn et al. |
| 7,464,166 B2 | 12/2008 | Larsson et al. |
| 7,474,686 B2* | 1/2009 | Ho ............ 375/132 |
| 7,519,016 B2 | 4/2009 | Lee et al. |
| 7,551,546 B2 | 6/2009 | Ma |
| 7,630,403 B2 | 12/2009 | Ho et al. |
| 7,631,247 B2 | 12/2009 | Petrovic et al. |
| 7,778,337 B2 | 8/2010 | Tong et al. |
| 2002/0034161 A1 | 3/2002 | Deneire et al. |
| 2002/0034172 A1 | 3/2002 | Ho et al. |
| 2002/0041635 A1 | 4/2002 | Ma et al. |
| 2002/0080902 A1* | 6/2002 | Kim et al. ............ 375/377 |
| 2002/0097697 A1* | 7/2002 | Bae et al. ............ 370/335 |
| 2002/0119784 A1 | 8/2002 | Agin et al. |
| 2002/0122431 A1 | 9/2002 | Cho et al. |
| 2002/0136273 A1 | 9/2002 | Hoole et al. |
| 2002/0145968 A1 | 10/2002 | Zhang et al. |
| 2002/0145970 A1 | 10/2002 | Han et al. |
| 2002/0160781 A1 | 10/2002 | Bark et al. |
| 2002/0196731 A1 | 12/2002 | Laroia et al. |
| 2003/0012174 A1* | 1/2003 | Bender et al. ............ 370/347 |
| 2003/0079022 A1 | 4/2003 | Toporek et al. |
| 2003/0123481 A1 | 7/2003 | Neale et al. |
| 2003/0135640 A1 | 7/2003 | Ho et al. |
| 2003/0161343 A1 | 8/2003 | Ghosh et al. |
| 2003/0165131 A1* | 9/2003 | Liang et al. ............ 370/342 |
| 2003/0169769 A1 | 9/2003 | Ho et al. |
| 2003/0174662 A1 | 9/2003 | Malkamaki |
| 2003/0214930 A1 | 11/2003 | Fischer |
| 2003/0227898 A1 | 12/2003 | Logalbo et al. |
| 2003/0228865 A1 | 12/2003 | Terry et al. |
| 2004/0001429 A1 | 1/2004 | Ma et al. |
| 2004/0047298 A1 | 3/2004 | Yook et al. |
| 2004/0062206 A1 | 4/2004 | Soong |
| 2004/0082336 A1 | 4/2004 | Jami et al. |
| 2004/0082356 A1 | 4/2004 | Walton et al. |
| 2004/0095903 A1 | 5/2004 | Ryan et al. |
| 2004/0114552 A1* | 6/2004 | Lim et al. ............ 370/324 |
| 2004/0116125 A1 | 6/2004 | Terry et al. |
| 2004/0120304 A1* | 6/2004 | Kloos et al. ............ 370/347 |

| | | | | | | |
|---|---|---|---|---|---|---|
| 2004/0131007 | A1 | 7/2004 | Smee et al. | RU | 2111619 | 5/1998 |
| 2004/0136445 | A1 | 7/2004 | Olson et al. | RU | 2150174 C1 | 5/2000 |
| 2004/0137943 | A1 | 7/2004 | Tseng | RU | 2180159 C2 | 2/2002 |
| 2004/0170439 | A1* | 9/2004 | Hiironen ............... 398/190 | RU | 2335852 C2 | 10/2008 |
| 2004/0184471 | A1 | 9/2004 | Chuah et al. | TW | 508922 | 11/2002 |
| 2004/0196871 | A1 | 10/2004 | Terry et al. | WO | WO92010890 | 6/1992 |
| 2004/0205105 | A1 | 10/2004 | Larsson et al. | WO | 9408432 | 4/1994 |
| 2004/0213278 | A1 | 10/2004 | Pullen et al. | WO | 97030526 | 8/1997 |
| 2004/0228267 | A1 | 11/2004 | Agrawal et al. | WO | WO98014026 | 4/1998 |
| 2004/0229615 | A1 | 11/2004 | Agrawal | WO | WO99014878 | 3/1999 |
| 2004/0235472 | A1 | 11/2004 | Fujishima et al. | WO | 99043114 | 8/1999 |
| 2004/0253968 | A1 | 12/2004 | Chang et al. | WO | WO9966748 A1 | 12/1999 |
| 2005/0002369 | A1 | 1/2005 | Ro et al. | WO | 0161902 | 8/2001 |
| 2005/0030976 | A1 | 2/2005 | Wentick | WO | 01076110 | 10/2001 |
| 2005/0034049 | A1 | 2/2005 | Nemawarkar et al. | WO | 02003556 | 1/2002 |
| 2005/0044439 | A1 | 2/2005 | Shatas et al. | WO | 0237887 | 5/2002 |
| 2005/0165949 | A1 | 7/2005 | Teague | WO | 02049306 | 6/2002 |
| 2005/0202784 | A1 | 9/2005 | Xu et al. | WO | 99044316 | 6/2002 |
| 2005/0272432 | A1 | 12/2005 | Ji et al. | WO | WO02049305 | 6/2002 |
| 2005/0281242 | A1 | 12/2005 | Sutivong et al. | WO | 03019852 | 3/2003 |
| 2005/0281290 | A1* | 12/2005 | Khandekar et al. ............ 370/500 | WO | 03021829 | 3/2003 |
| 2006/0045001 | A1 | 3/2006 | Jalali | WO | WO03034645 A1 | 4/2003 |
| 2006/0114848 | A1 | 6/2006 | Eberle et al. | WO | WO2004015946 A1 | 2/2004 |
| 2006/0133308 | A1 | 6/2006 | Madan et al. | WO | WO2004040813 A1 | 5/2004 |
| 2006/0203932 | A1* | 9/2006 | Palanki et al. ................ 375/295 | WO | WO2004073219 A1 | 8/2004 |
| 2006/0209927 | A1* | 9/2006 | Khandekar et al. ........... 375/146 | WO | WO2004079937 A2 | 9/2004 |
| 2006/0218302 | A1 | 9/2006 | Chia et al. | WO | WO2005074184 A2 | 8/2005 |
| 2006/0221810 | A1* | 10/2006 | Vrcelj et al. .................. 370/208 | WO | 2006022876 | 3/2006 |
| 2006/0279435 | A1 | 12/2006 | Krishnan et al. | | | |
| 2007/0206623 | A1 | 9/2007 | Tiedemann et al. | | | |
| 2008/0075184 | A1 | 3/2008 | Muharemovic et al. | | | |
| 2008/0137652 | A1 | 6/2008 | Herrmann et al. | | | |
| 2009/0245421 | A1 | 10/2009 | Montojo et al. | | | |
| 2010/0002570 | A9 | 1/2010 | Walton | | | |
| 2010/0034164 | A1 | 2/2010 | Ho et al. | | | |
| 2010/0182911 | A1 | 7/2010 | Pullen et al. | | | |
| 2011/0145584 | A1 | 6/2011 | Coburn et al. | | | |

FOREIGN PATENT DOCUMENTS

| | | |
|---|---|---|
| DE | 19701011 C1 | 6/1998 |
| DE | 19747369 A1 | 5/1999 |
| EP | 0658028 | 6/1995 |
| EP | 0768806 | 4/1997 |
| EP | 0917316 | 5/1999 |
| EP | 1039683 | 9/2000 |
| EP | 1043861 | 6/2002 |
| EP | 1265411 | 12/2002 |
| EP | 1286491 | 2/2003 |
| EP | 1513272 A1 | 3/2005 |
| EP | 1919152 A2 | 5/2008 |
| GB | 2350753 A | 12/2000 |
| JP | 04127738 | 4/1992 |
| JP | 04367135 | 12/1992 |
| JP | 07327248 | 12/1995 |
| JP | 09233047 | 9/1997 |
| JP | 09266466 | 10/1997 |
| JP | 10336159 | 12/1998 |
| JP | 11113049 | 4/1999 |
| JP | 11331121 | 11/1999 |
| JP | 11346203 | 12/1999 |
| JP | 2000111631 A | 4/2000 |
| JP | 2000504908 T | 4/2000 |
| JP | 2000201134 A | 7/2000 |
| JP | 2000252947 | 9/2000 |
| JP | 2002111631 A | 4/2002 |
| JP | 2002152167 | 5/2002 |
| JP | 2003060645 A | 2/2003 |
| JP | 2003060655 | 2/2003 |
| JP | 2003078565 | 3/2003 |
| JP | 2003218826 A | 7/2003 |
| JP | 2003520499 T | 7/2003 |
| JP | 2004007353 A | 1/2004 |
| JP | 2004159345 A | 6/2004 |
| JP | 2004312291 A | 11/2004 |
| JP | 2005508103 T | 3/2005 |
| JP | 2005512458 T | 4/2005 |
| JP | 2005536103 | 11/2005 |
| JP | 2006505229 | 2/2009 |
| KR | 030017401 | 3/2003 |

OTHER PUBLICATIONS

Supplemental European Search Report—EP04751717, European Search Authority—The Hague—May 21, 2008.
Written Opinion—PCT/US04/14453—International Search Authority—ISA/US—Jan. 11, 2006.
International Preliminary Examination Report—International Preliminary Examining Authority—IPEA/US—Jun. 8, 2006.
Gromakov, Ju.A., "Standards and Systems of Mobile Communications (Mobile Radio Communication Standards and Systems)" Moscow: Mobilnye Telesistemy—Eko Trands, 1997, pp. 59-61.
Elkashlan M. et al, Performance of Frequency-Hopping Multicarrier Cdma on a Uplink with Conference Proceedings, San Francisco, CA Dec. 1-5, 2003, IEEE Global Telecommunications Conference, NY, NY, IEEE, US, vol. 7 of 7, Dec. 1, 2003, pp. 3407-3411.
Hui Won Je et al, "A Novel Multiple Access Scheme for Uplink Cellular Systems 1," Vehicular Technology Conference, 2004, VTC2004-fall, 2004 IEEE 60th Los Angeles, CA, US, Sep. 26-29, 2004, Piscataway, NY, pp. 984-988.
Tonello A.M. et al. "An Asynchronous Multitone Multiuser Air Interface for High-speed Uplink Communications," Vehicular Technology Conference, 2003, VTC 2003 Fall, 2003 IEEE 58th, Orlando, Fl, US Oct. 6-9, 2003, Piscataway, NJ, US, IEEE, US.
European Search Report—EP09173835, The Hague, Feb. 4, 2010.
Sudarshan Roa,et al., Allocation and Fairness for downlink shared Data channels, Mar. 16-20, 2003, 2003 IEEE. Wireless Communication and Networking, 2003 WCNC 2003, pp.- 1049-1054.
Van De Beek, et al., "On Channel Estimation in OFDM Systems," Proceedings of Vehicular Technology Conference (1995), vol. 2, pp. 815-819, Chicago, USA.
IEEE Communications Magazine, Apr. 2002, David Falconer et al., Frequency Domain Equalization for Single-Carrier Broadband Wireless Systems.
Technical Specification Group Radio Access Network: "3GGP TR25.848 V4.0.0 Physical layer aspects of UTRA High Speed Downlink Packet Access (Release 4)" 3GPP TR 25.848 V4.0.0, XX, XX, May 4, 2001, pp. 1-82, XP002189517 pp. 8, 38, and 50.
"A Time and Frequency Synchronization Scheme for Multiuser OFDM" by JJ Van De Beek et al., IEEE Journal of Selected Areas in Communications, vol. 17, No. 11, pp. 1900-1914, Published in Nov. 1999.
Kapoor, S. et al., "Pilot assisted synchronization for wireless OFDM systems over fast time varying fading channels," Vehicular Technology Conference, 1998. VTC 98. 48th IEEE, May 18, 1998, vol. 3, pp. 2077-2080.

Yasunori Matsui et al., "A Study on Adaptive Uplink Resource Control Scheme for Asymmetric Packet Radio Communication Systems using OFDMA/TDD Technique," Technical Report of IEICE, Nov. 10, 2000, vol. 100, No. 435, pp. 63-70, RCS 2000-172 (Abstract).

Zhongren Cao et al., "Analysis of two receiver schemes for interleaved Ofdma uplink," Signals, Systems and Computers, 2002. Conference Record of the Thirty-Sixth Asilomar Conference on, Nov. 3, 2002, vol. 2, pp. 1818-1821.

European Search Report—EP11174161, Search Authority—The Hague Patent Office, Jan. 8, 2011.

European Search Report—EP11174166 , Search Authority—The Hague Patent Office, Jan. 8, 2011.

M Miyoshi et al.,"Performance Improvement of TCP in wireless cellular network based acknowledgement control", Department of Infomatics and Mathematical Secience, Gradute School of Engineering Science, Osaka University, Japan, Proceedings of the 7th Asia Pacific, pp. 1-15, 2001.

Miller et al., "Cumulative acknowledgement multicast repetition policy for wirless LANs or ad hoc network clusters" IEEE, Wireless Communication Technologies Group National Institute of Standards and Technology, Maryland Gaithersburg, pp. 3403-3407, 2002.

Suppplementary European Search Report—EP03781519—Search Authority—The Hauge—Jan. 6, 2011.

Taiwan Search Report—TW093113201—TIPO—Apr. 26, 2011.

\* cited by examiner

TDM/CDM Pilot Transmission

Continuous CDM Pilot Transmission

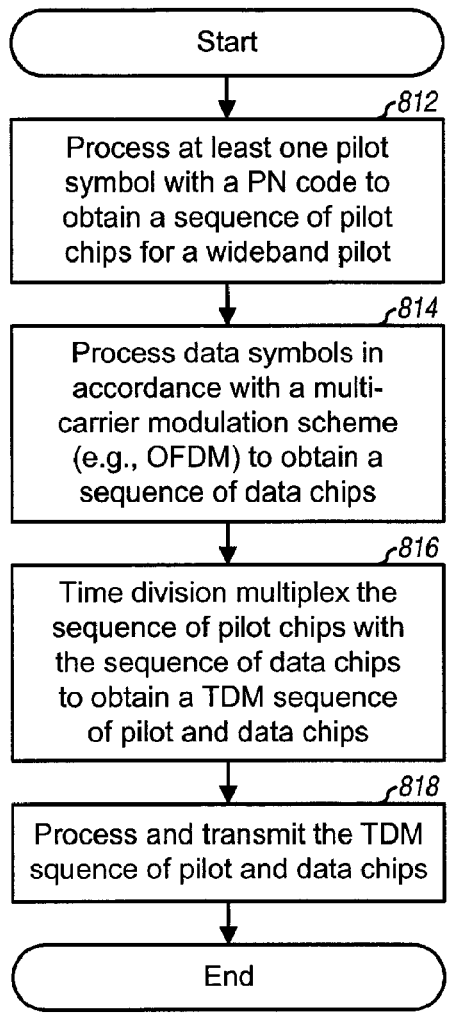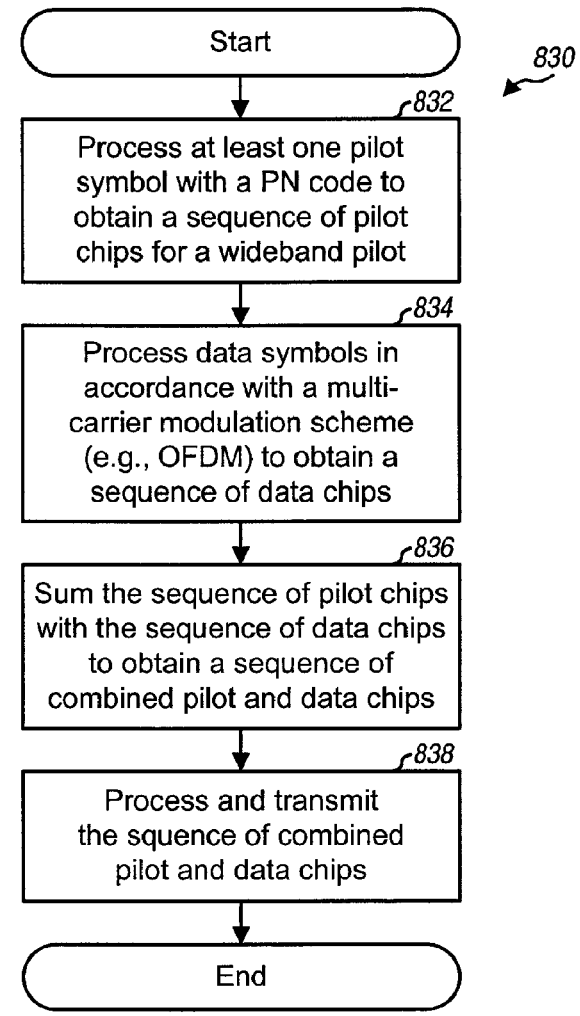
FIG. 8A
FIG. 8B

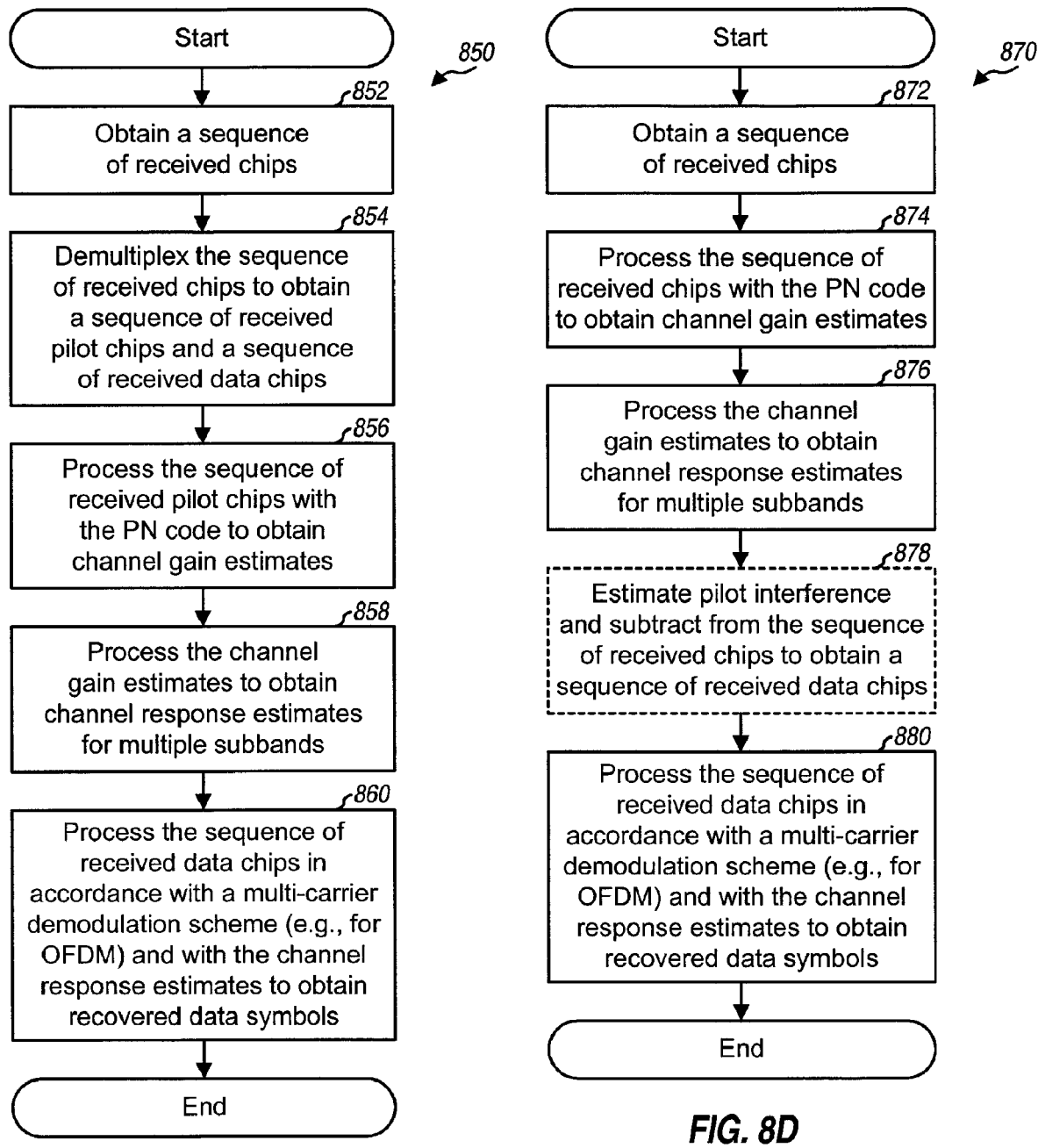

FAST FREQUENCY HOPPING WITH A CODE DIVISION MULTIPLEXED PILOT IN AN OFDMA SYSTEM

CROSS-REFERENCE TO RELATED APPLICATION

This application is a continuation of U.S. patent application Ser. No. 10/726,944, filed on Dec. 3, 2003, now issued as U.S. Pat. No. 7,177,297, which in turn claims the benefit of priority of U.S. Provisional Patent Application entitled "Fast Frequency Hopping with a Code Division Multiplexed Pilot in an OFDMA System", Ser. No. 60/470,107, filed on May 12, 2003. The foregoing described applications are herein incorporated by reference in their entirety.

BACKGROUND

1. Field

The present invention relates generally to communication, and more specifically to techniques for supporting fast frequency hopping with a code division multiplexed (CDM) pilot in an orthogonal frequency division multiple access (OFDMA) communication system.

2. Background

In a frequency hopping spread spectrum (FHSS) communication system, data is transmitted on different frequency subbands or sub-carriers in different time intervals, which are also referred to as "hop periods". These frequency subbands may be provided by orthogonal frequency division multiplexing (OFDM), other multi-carrier modulation techniques, or some other constructs. With FHSS, the data transmission hops from subband to subband in a pseudo-random manner. This hopping provides frequency diversity and allows the data transmission to better withstand deleterious path effects such as narrow-band interference, jamming, fading, and so on.

An OFDMA system utilizes OFDM and can support multiple users simultaneously. For a frequency hopping OFDMA system, data for each user is transmitted using a specific frequency hopping (FH) sequence assigned to the user. The FH sequence indicates the specific subband to use for data transmission in each hop period. Multiple data transmissions for multiple users may be sent simultaneously using different FH sequences. These FH sequences are defined to be orthogonal to one another so that only one data transmission uses each subband in each hop period. By using orthogonal FH sequences, intra-cell interference is avoided, and the multiple data transmissions do not interfere with one another while enjoying the benefits of frequency diversity.

An OFDMA system may be deployed with multiple cells, where a cell typically refers to a base station and/or its coverage area. A data transmission on a given subband in one cell acts as interference to another data transmission on the same subband in a neighboring cell. To randomize inter-cell interference, the FH sequences for each cell are typically defined to be pseudo-random with respect to the FH sequences for neighboring cells. By using pseudo-random FH sequences, interference diversity is achieved, and the data transmission for a user in a given cell would observe, over a sufficiently long time period, the average interference from the data transmissions for other users in other cells.

The inter-cell interference can vary significantly from subband to subband at any given moment. To account for the variation in interference across the subbands, a margin is typically used in the selection of a data rate for a data transmission. A large margin is normally needed to achieve a low packet error rate (PER) for the data transmission if the variability in interference is large. The large margin results in a greater reduction in the data rate for the data transmission, which limits system capacity.

Frequency hopping can average the inter-cell interference and reduce the required margin. Increasing the frequency hopping rate results in better interference averaging and decreases the required margin. Fast frequency hopping rate is especially beneficial for certain types of transmissions that encode data across multiple frequency hops and which cannot use other techniques, such as automatic request for retransmission (ARQ), to mitigate the deleterious effects of interference.

Frequency hopping rates are generally limited by channel estimation requirements. For an OFDMA system, the channel response for each subband used for data transmission is typically estimated by a receiver, and the channel response estimate for the subband is then used to coherently demodulate data symbols received on that subband. Channel estimation for each subband is normally achieved based on pilot symbols received on the subband. In a fast-fading communication channel, the fading rate normally prohibits the receiver from combining pilot symbols received on the same subband from previous hops. Thus, to independently estimate the channel response for each hop period, a sufficient number of pilot symbols needs to be transmitted in the hop period so that the receiver can obtain a sufficiently accurate channel response estimate. These pilot symbols represent a fixed overhead for each hop period. In this case, increasing the frequency hopping rate also increases the pilot overhead.

There is therefore a need in the art for techniques to support fast frequency hopping without increasing pilot overhead in an OFDMA system.

SUMMARY

Techniques are provided herein to support fast frequency hopping with a CDM pilot in a multi-carrier communication system (e.g., an OFDMA system). Each transmitter (e.g., each terminal) in the system transmits a wideband pilot on all subbands to allow a receiver (e.g., a base station) to estimate the entire channel response at the same time. The wideband pilot for each transmitter may be generated using direct sequence spread spectrum processing and based on a pseudo-random number (PN) code assigned to that transmitter. This allows the receiver to individually identify and recover multiple wideband pilots transmitted concurrently by multiple transmitters. For a time division multiplexed (TDM)/CDM pilot transmission scheme, each transmitter transmits the wideband pilot in bursts. For a continuous CDM pilot transmission scheme, each transmitter continuously transmits the wideband pilot, albeit at a low transmit power level.

At a transmitter, at least one pilot symbol is processed with the PN code assigned to the transmitter to obtain a sequence of pilot chips for a wideband pilot. Data symbols are processed in accordance with a multi-carrier modulation scheme (e.g., OFDM) to obtain a sequence of data chips. If the data symbols are to be transmitted with frequency hopping, then the particular subband to use for the data symbols in each hop period is determined by an FH sequence assigned to the transmitter. For the TDM/CDM pilot transmission scheme, the sequence of pilot chips is time division multiplexed with the sequence of data chips to obtain a TDM sequence of pilot and data chips, which is further processed and transmitted. For the continuous CDM pilot transmission scheme, the sequence of pilot chips is summed with the sequence of data chips to obtain a sequence of combined pilot and data chips, which is further processed and transmitted.

At a receiver, a sequence of received chips is initially obtained. For the TDM/CDM pilot transmission scheme, the sequence of received chips is demultiplexed to obtain a sequence of received pilot chips and a sequence of received data chips. The sequence of received pilot chips (for the TDM/CDM pilot transmission scheme) or the sequence of received chips (for the continuous CDM pilot transmission scheme) is processed with the PN code assigned to the transmitter to obtain time-domain channel gain estimates for multiple propagation paths from the transmitter to the receiver. A rake receiver may be used for the pilot processing at the receiver. The channel gain estimates are further processed (e.g., interpolated) and transformed to obtain frequency-domain channel response estimates for multiple subbands.

For the continuous CDM pilot transmission scheme, pilot interference cancellation may be performed on the sequence of received chips (based on the channel gain estimates) to obtain the sequence of received data chips. For both pilot transmission schemes, the sequence of received data chips (if available) or the sequence of received chips is processed in accordance with a multi-carrier demodulation scheme (e.g., for OFDM) and with the channel response estimates to obtain recovered data symbols, which are estimates of the data symbols transmitted by the transmitter. If the data symbols were transmitted with frequency hopping, then the particular subband from which to obtain the recovered data symbols in each hop period is determined by the same FH sequence used at the transmitter.

The techniques described herein can provide various advantages, including the ability to support any frequency hopping rate without impacting pilot overhead. In fact, the frequency hopping rate may be as fast as one OFDM symbol per hop period. A fast frequency hopping rate can improve interference averaging and reduce the required margin, which can improve utilization of the system capacity.

Various aspects and embodiments of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein:

FIG. 8A shows a process for transmitting a wideband pilot with the TDM/CDM pilot transmission scheme;

FIG. 8B shows a process for transmitting a wideband pilot with the continuous CDM pilot transmission scheme;

FIG. 8C shows a process for receiving a wideband pilot with the TDM/CDM pilot transmission scheme; and FIG. 8D shows a process for receiving a wideband pilot with the continuous CDM pilot transmission scheme.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

In the following description, a "channel gain estimate" is a time-domain estimate of the complex channel gain for a propagation path from a transmitter to a receiver. A "channel frequency response estimate" (or simply, a "channel response estimate") is a frequency-domain estimate of the channel response for a particular subband of a communication channel between the transmitter and the receiver. (The communication channel may include a number of propagation paths.) Channel gain estimates may be processed and transformed to obtain channel response estimates, as described below. A "channel estimate" can generically refer to a channel gain estimate, a channel response estimate, or some other type of estimate for the communication channel.

An OFDMA system utilizes OFDM, which is a multi-carrier modulation technique that effectively partitions the overall system bandwidth into a number of (N) orthogonal subbands. These subbands are also commonly referred to as tones, sub-carriers, bins, and frequency subchannels. With OFDM, each subband is associated with a respective sub-carrier that may be modulated with data. In some OFDM systems, only $N_{data}$ subbands are used for data transmission, $N_{pilot}$ subbands are used for pilot transmission, and $N_{guard}$ subbands are not used and serve as guard subbands to allow the systems to meet spectral mask requirements, where $N=N_{data}+N_{pilot}+N_{guard}$. For simplicity, the following description assumes that all N subbands can be used for data transmission.

Figure 1:
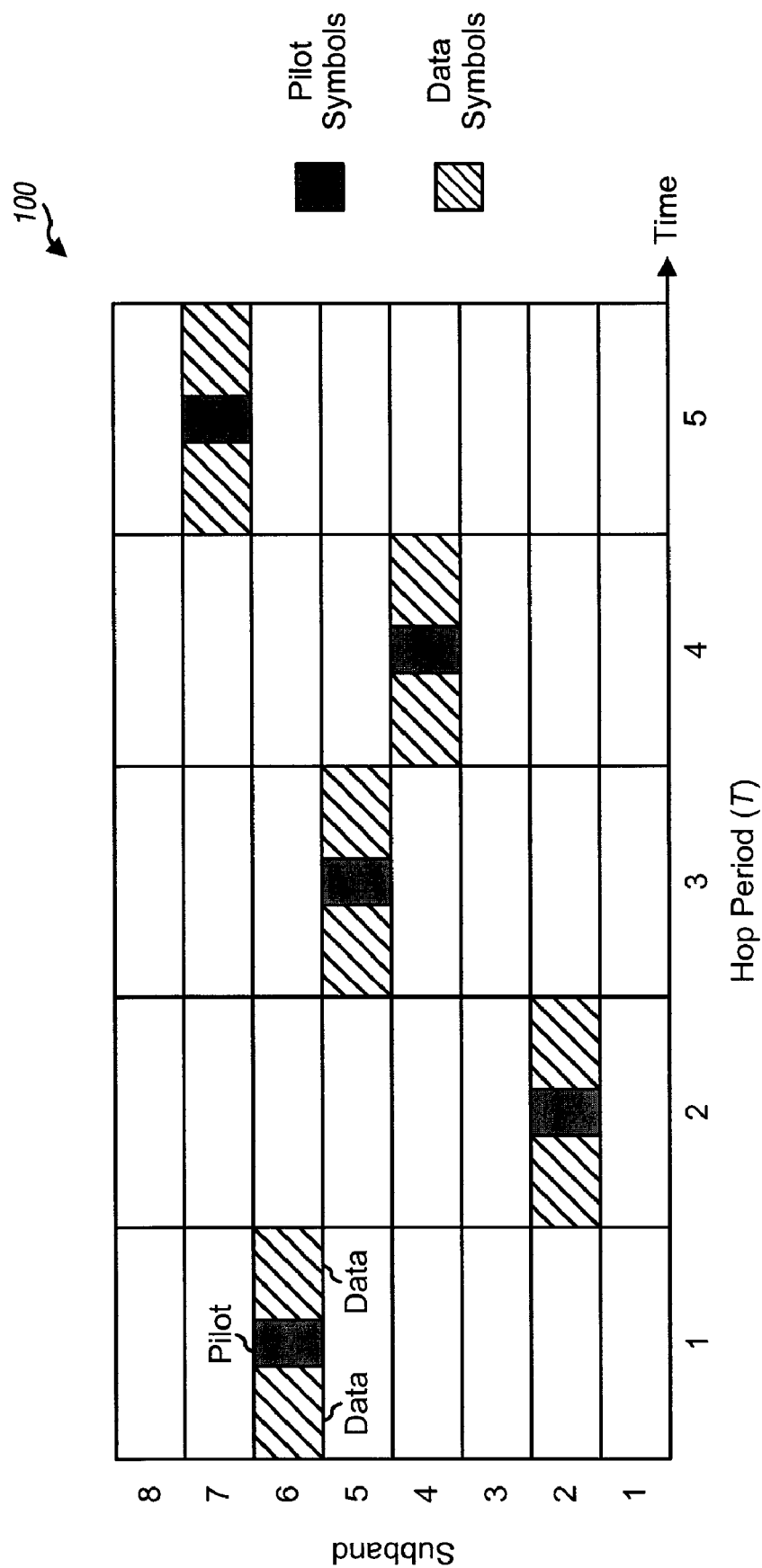
FIG. 1 shows a conventional pilot transmission scheme for a frequency hopping OFDMA system.

FIG. 1 shows a conventional pilot transmission scheme 100 for a frequency hopping OFDMA system. FIG. 1 shows pilot and data transmission on a frequency-time plane whereby the vertical axis represents frequency and the horizontal axis represents time. For this example, N=8, and the eight subbands are assigned indices of 1 through 8. Up to eight traffic channels may be defined whereby each traffic channel uses one of the eight subbands in each hop period. A hop period is the time duration spent on a given subband and may be defined to be equal to the duration of one or multiple OFDM symbols.

Each traffic channel is associated with a different FH sequence. The FH sequences for all traffic channels may be generated with an FH function $f(k, T)$, where k denotes the traffic channel number and T denotes system time, which is given in units of hop periods. N different FH sequences may be generated with N different values of k in the FH function $f(k,T)$. The FH sequence for each traffic channel indicates the particular subband to use for that traffic channel in each hop period. For clarity, FIG. 1 shows the subbands used for one traffic channel. It can be seen in FIG. 1 that this traffic channel hops from subband to subband in a pseudo-random manner determined by its FH sequence.

For conventional pilot transmission scheme 100, a group of P pilot symbols (depicted as solid boxes) is transmitted in a TDM manner with a group of data symbols (depicted as diagonal boxes) in each hop period, where P≧1. Typically, P is the number of pilot symbols needed to allow a receiver to independently estimate the channel response in each hop period. The P pilot symbols represent a fixed overhead that is needed for each hop period. This fixed overhead becomes a larger percentage of a transmission as the hop period decreases. The frequency hopping rate is thus constrained by the pilot overhead.

Pilot transmission schemes suitable for use with fast frequency hopping in a multi-carrier communication system are provided herein. These pilot transmission schemes are well suited for use on the reverse link but may also be used for the forward link. For clarity, these pilot transmission schemes are specifically described below for the reverse link of an OFDMA system.

Figure 2:
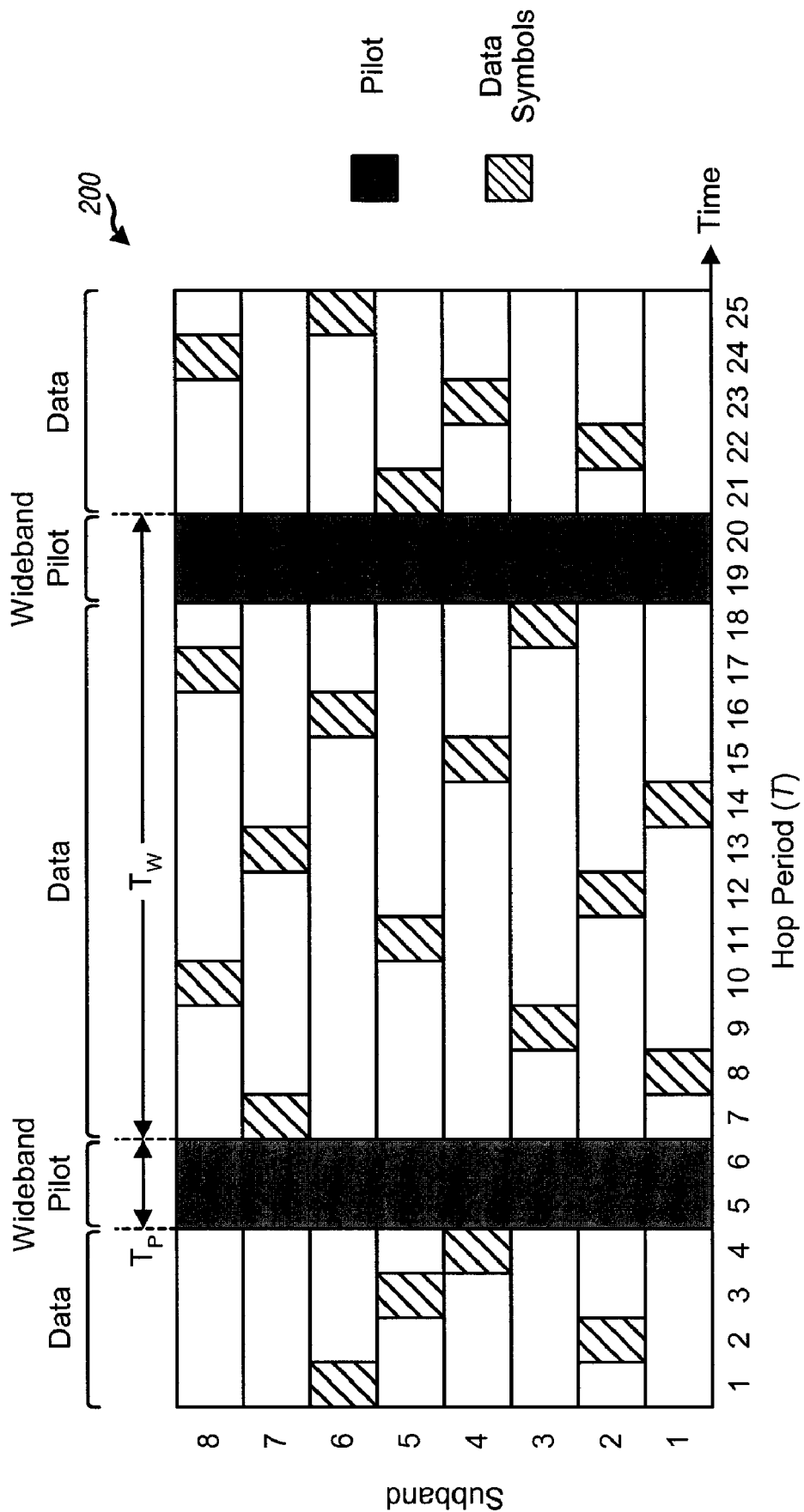
FIG. 2 shows the TDM/CDM pilot transmission scheme.

FIG. 2 shows a TDM/CDM pilot transmission scheme 200 for a frequency hopping OFDMA system. For this pilot transmission scheme, each user transmits a wideband pilot that is time division multiplexed with the user's data transmission. The wideband pilot is transmitted on all N subbands and allows a receiver (e.g., a base station) to estimate the entire channel response at the same time. The wideband pilot may be generated in the time domain using direct sequence spread spectrum processing, as described below.

The wideband pilot has a duration of $T_P$ seconds, or $T_P=N_P \cdot T_S$, where $N_P$ is the number of OFDM symbol periods in which the wideband pilot is transmitted and $T_S$ is the duration of one OFDM symbol. For the example shown in FIG. 2, $T_P=2 \cdot T_S$, where one hop period corresponds to one OFDM symbol period. In general, the pilot duration $T_P$ is selected to be sufficiently long to allow the receiver to obtain a sufficiently accurate channel response estimate for each of the users. The pilot duration $T_P$ may be dependent on various factors such as the amount of transmit power available to each user, the expected worst-case channel conditions for all users, and so on.

The wideband pilot is transmitted every $T_W$ seconds and has a periodicity of $T_W$ seconds. For the example shown in FIG. 2, $T_W=14 \cdot T_S$. In general, the pilot periodicity $T_W$ may be selected to be shorter than the coherence time τ of the communication channel, i.e., $T_W < \tau$. The coherence time is the time interval over which the communication channel is essentially constant. By selecting $T_W < \tau$, the channel response estimates can be assured to be valid for the entire $T_W$ seconds between wideband pilot bursts.

For the TDM/CDM pilot transmission scheme, the pilot overhead is determined by the pilot duration $T_P$ and the pilot periodicity $T_W$, which are in turn dependent on certain characteristics of the communication channel (e.g., the coherence time). This pilot transmission scheme can support any frequency hopping rate without impacting pilot overhead. In fact, the frequency hopping rate may be as fast as one OFDM symbol per hop period (i.e., symbol-rate hopping), which is highly desirable for the reasons noted above.

As shown in FIG. 2, the wideband pilot for each user is transmitted in bursts and does not interfere with the data transmission for that user. To avoid pilot-to-data interference for all users in a cell, the users can transmit their wideband pilots in the same time interval. In this case, the wideband pilots for all users in each cell would not interfere with their data transmissions. Moreover, the data transmissions of all users in each cell would not interfere with one another because these users use orthogonal FH sequences.

The transmission of the wideband pilots by all users at the same time implies that these wideband pilots will interfere with one another. To mitigate pilot-to-pilot interference, the wideband pilots for all users may be "orthogonalized". The orthogonalization of the wideband pilots may be achieved in various manners, some of which are described below.

In one embodiment, the pilot symbol for each user is "covered" with an orthogonal code that is unique to that user. Covering is a process whereby a pilot symbol to be transmitted is multiplied by all W chips of a W-chip orthogonal code to obtain W covered chips, which are further processed and transmitted. The orthogonal code may be a Walsh code, an orthogonal variable spreading factor (OVSF) code, a quasi-orthogonal function (QOF), and so on. The covered pilot for each user is then spectrally spread across all N subbands with a PN code that is common to all users. In general, any PN code having characteristics normally associated with a good PN code (e.g., a flat spectral response, low or zero cross-correlation at different time offsets, and so on) may be used for the spectral spreading. The PN code may also be referred to as a scrambling code or some other terminology.

In another embodiment, the pilot symbol for each user is spectrally spread across all N subbands with a PN code that is unique to that user. For this embodiment, the PN code is used for both orthogonalization and spectral spreading. The user-specific PN codes may be defined to be different time shifts of a common PN code, similar to the use of different time shifts of short PN codes for different base stations in IS-95 and IS-2000 systems. In this case, each user is assigned a unique time-shift and the PN code for that user can be identified by the assigned time-shift. The common PN code may be denoted as PN(n), the time-shift assigned to user x may be denoted as $\Delta T_x$, and the PN code for user x may be denoted as PN($n+\Delta T_x$).

For both embodiments, the wideband pilot for each user is both code division multiplexed and time division multiplexed. For clarity, the following description is for the embodiment whereby the wideband pilot for each user is spectrally spread with a user-specific PN code to suppress pilot interference from other users.

Referring to FIG. 2, the wideband pilot is transmitted using CDM and the data transmission is transmitted using OFDM. The processing at the transmitter and the receiver for the CDM/TDM pilot transmission scheme is described below.

Figure 3:
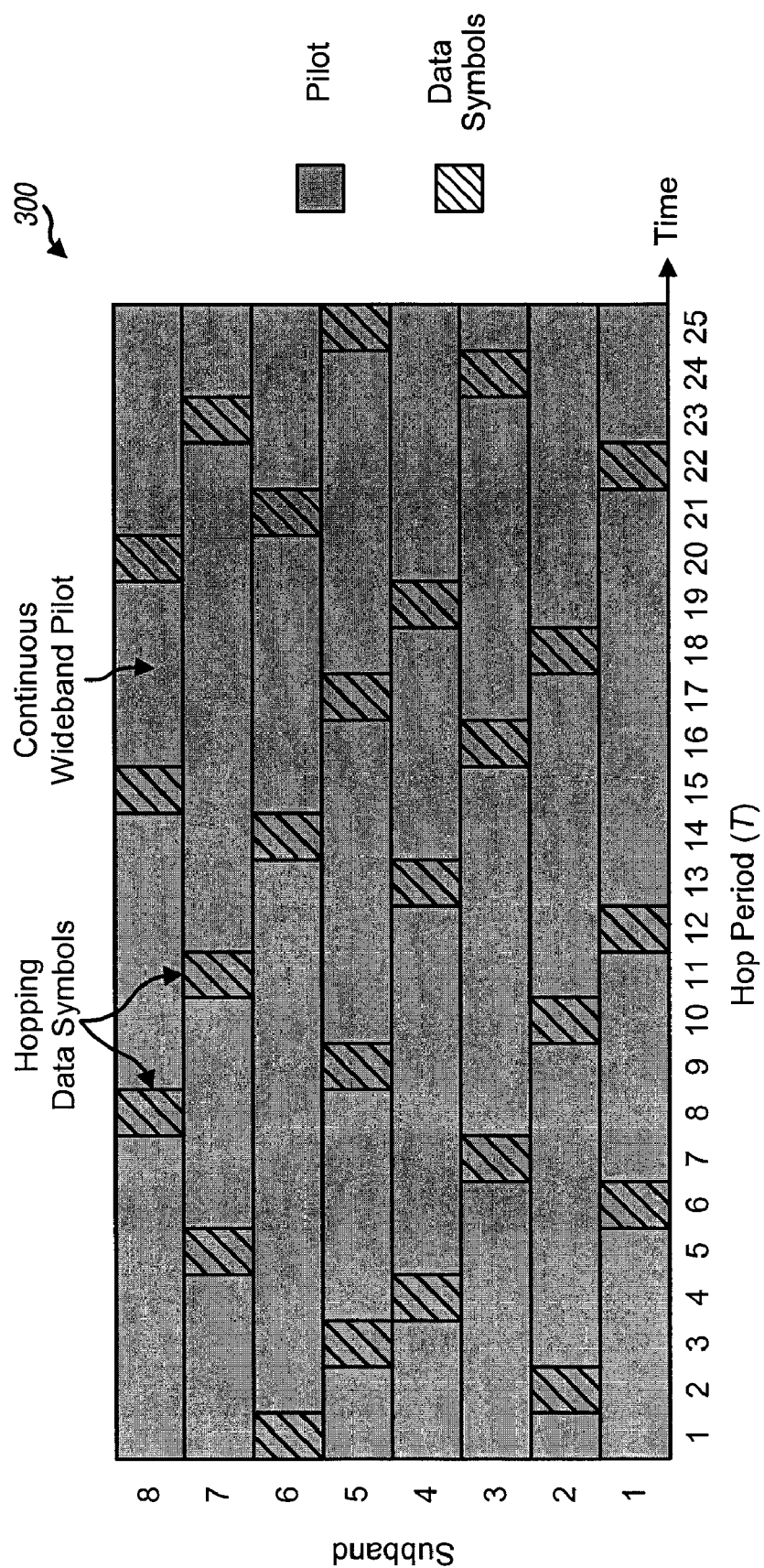
FIG. 3 shows the continuous CDM pilot transmission scheme.

FIG. 3 shows a continuous CDM pilot transmission scheme 300 for a frequency hopping OFDMA system. For this pilot transmission scheme, each user continuously transmits a wideband pilot that is superimposed over (i.e., added to) the data transmission. Again, the wideband pilot is transmitted on all N subbands and allows a receiver (e.g., a base station) to estimate the entire channel response.

The continuous wideband pilot may be transmitted at a low power level while still enabling the receiver to obtain a high-quality estimate of the channel response. This is because the receiver can integrate/accumulate many received pilot chips to realize a significant signal processing gain from the CDM integration, similar to the gain achieved in a CDMA system. Integration over many received pilot chips is possible since the communication channel is coherent over multiple OFDM symbol periods.

The continuous wideband pilot for each user interferes with one another. Similar to the TDM/CDM pilot transmission scheme, the wideband pilots for all users may be orthogonalized to mitigate pilot-to-pilot interference. The orthogonalization and spectral spreading of the wideband pilots for all users may be achieved with (1) different orthogonal codes and a common PN code or (2) different user-specific PN codes, as described above. For clarity, the following description assumes that the wideband pilot for each user is orthogonalized and spectrally spread with a user-specific PN code to suppress pilot interference from other users.

The continuous wideband pilot for each user also interferes with the data transmission for that user as well as the data transmissions for other users. This pilot-to-data interference is shown in FIG. 3, since the boxes for the data symbols should are also shaded to show that the wideband pilot is superimposed on these data symbols. However, as noted above, only a small amount of transmit power is needed for the continuous wideband pilot for each user. Thus, the total pilot interference observed by the data transmission for each user due to the wideband pilots for all users is small in magnitude. Moreover, the receiver may be able to estimate and cancel the interference due to the wideband pilots, as described below.

For the continuous CDM pilot transmission scheme (and also the TDM/CDM pilot transmission scheme), the pilot overhead is determined by the amount of transmit power used for the wideband pilot versus the amount of transmit power used for data transmission. The pilot overhead is thus fixed and not dependent on the frequency hopping rate. The continuous CDM pilot transmission scheme can support any frequency hopping rate (including symbol-rate hopping) without impacting pilot overhead.

For both the TDM/CDM pilot transmission scheme and the continuous CDM pilot transmission scheme, the wideband pilot from each user is typically transmitted at a predetermined power level. However, the wideband pilot may also be transmitted at a power level that may be controlled by a closed power control loop.

Figure 4:
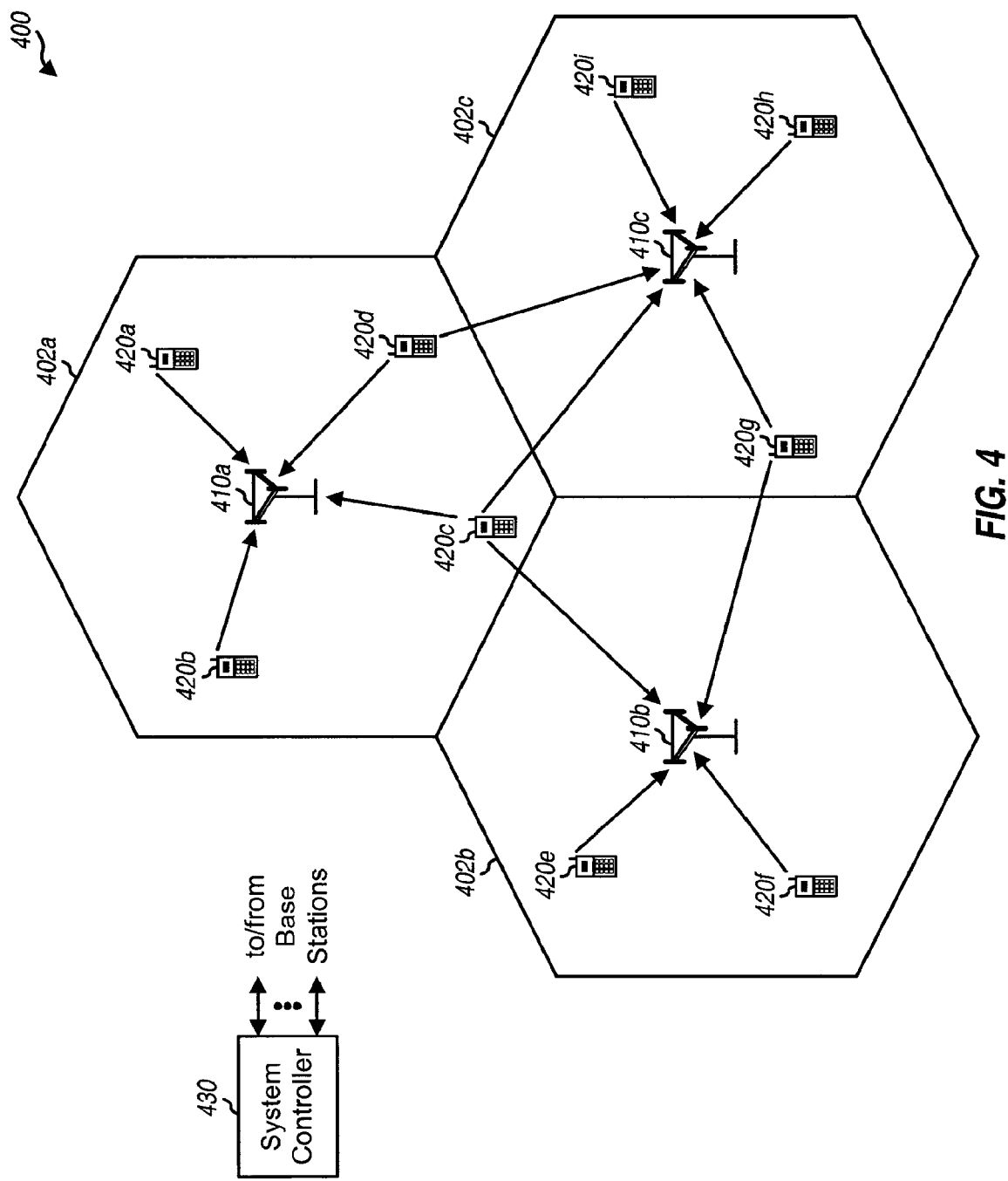
FIG. 4 shows an exemplary OFDMA system.

FIG. 4 shows an exemplary OFDMA system 400 that supports a number of users. System 400 includes a number of base stations 410, each having a coverage area 402, that provide communication for a number of terminals 420. A base station is a fixed station used for communicating with the terminals and may also be referred to as a base transceiver subsystem (BTS), an access point, a Node B, or some other terminology. Terminals 420 are typically dispersed throughout the system, and each terminal may be fixed or mobile. A terminal may also be referred to as a mobile station, a user equipment (UE), a wireless communication device, or some other terminology. Each terminal may communicate with one or more base stations on the forward link and/or one or more base stations on the reverse link at any given moment. This depends on whether or not the terminal is active, whether or not soft handoff is supported, and whether or not the terminal is in soft handoff. The forward link (i.e., downlink) refers to the communication link from the base station to the terminal, and the reverse link (i.e., uplink) refers to the communication link from the terminal to the base station. For simplicity, only transmissions on the reverse link are shown in FIG. 4.

A system controller 430 couples to base stations 410 and may perform a number of functions such as (1) coordination and control for these base stations, (2) routing of data among these base stations, and (3) access and control of the terminals served by these base stations.

Figure 5A:
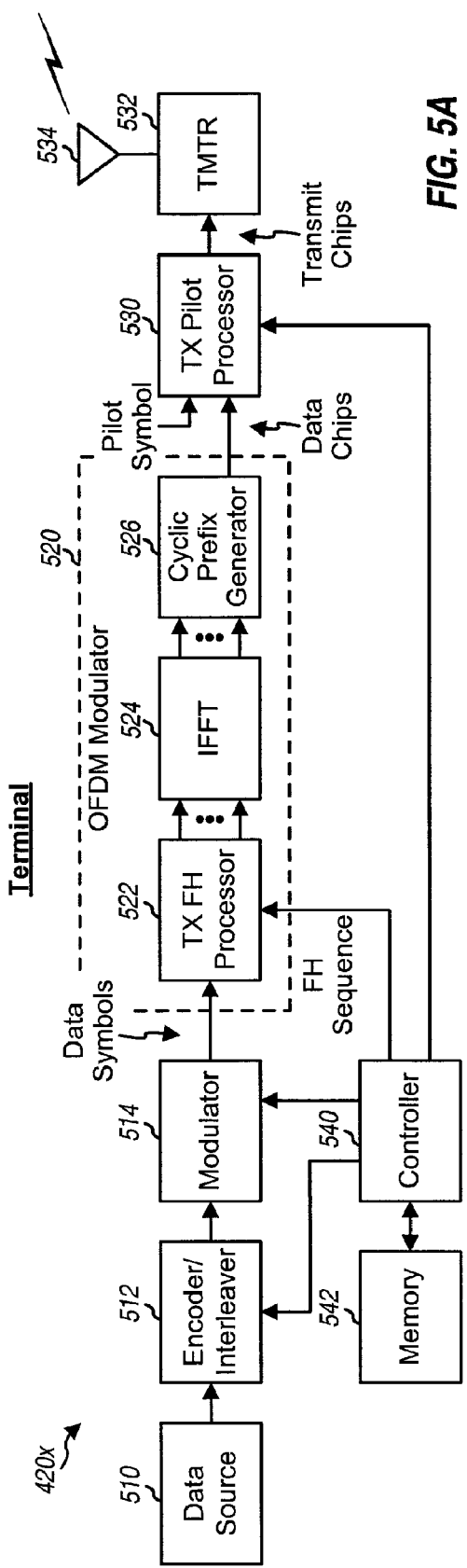
FIGS. 5A and 5B show block diagrams of a terminal and a base station, respectively.

FIG. 5A shows a block diagram of an embodiment of a terminal 420x, which is one of the terminals in OFDMA system 400. For simplicity, only the transmitter portion of terminal 420x is shown in FIG. 5A.

Within terminal 420x, an encoder/interleaver 512 receives traffic data from a data source 510 and possibly control data and other data from a controller 540. Encoder/interleaver 512 formats, encodes, and interleaves the received data to provide coded data. A modulator 514 then modulates the coded data in accordance with one or more modulation schemes (e.g., QPSK, M-PSK, M-QAM, and so on) to provide modulation symbols (or simply, "data symbols"). Each modulation symbol is a complex value for a specific point in a signal constellation for the modulation scheme used for that modulation symbol.

An OFDM modulator 520 performs frequency hopping and OFDM processing for the data symbols. Within OFDM modulator 520, a TX FH processor 522 receives the data symbols and provides these data symbols on the proper subbands determined by an FH sequence for a traffic channel assigned to terminal 420x. This FH sequence indicates the specific subband to use in each hop period and is provided by controller 540. For the TDM/CDM pilot transmission scheme, TX FH processor 522 provides data symbols only during periods of data transmission, as shown in FIG. 2. For the continuous CDM pilot transmission scheme, TX FH processor 522 provides data symbols continuously for each hop period, as shown in FIG. 3. In any case, the data symbols dynamically hop from subband to subband in a pseudo-random manner determined by the FH sequence. For each OFDM symbol period, TX FH processor 522 provides N "transmit" symbols for the N subbands. These N transmit symbols are composed of one data symbol for the subband used for data transmission (if data is being transmitted) and a signal value of zero for each subband not used for data transmission.

An inverse fast Fourier transform (IFFT) unit 524 receives the N transmit symbols for each OFDM symbol period. IFFT unit 524 then transforms the N transmit symbols to the time domain using an N-point inverse FFT to obtain a "transformed" symbol that contains N time-domain "data" chips. Each data chip is a complex value to be transmitted in one chip period. (The chip rate is related to the overall bandwidth of the system.) A cyclic prefix generator 526 receives the N data chips for each transformed symbol and repeats a portion of the transformed symbol to form an OFDM symbol that contains N+$C_p$ data chips, where $C_p$ is the number of data chips being repeated. The repeated portion is often referred to as a cyclic prefix and is used to combat inter-symbol interference (ISI) caused by frequency selective fading. An OFDM symbol period corresponds to the duration of one OFDM symbol, which is N+$C_p$ chip periods. Cyclic prefix generator 526 provides a stream of data chips for a stream of OFDM symbols.

A transmit (TX) pilot processor 530 receives the stream of data chips and at least one pilot symbol. TX pilot processor 530 generates a wideband pilot that is either time division multiplexed with the data chips (for the TDM/CDM pilot transmission scheme) or superimposed over the data chips (for the continuous CDM pilot transmission scheme). TX pilot processor 530 provides a stream of "transmit" chips. For the TDM/CDM pilot transmission scheme, each transmit chip is either a data chip or a pilot chip. For the continuous CDM pilot transmission scheme, each transmit chip is a sum of a data chip and a pilot chip. A transmitter unit (TMTR) 532 processes the stream of transmit chips to obtain a modulated signal, which is transmitted from an antenna 534 to the base station.

Figure 5B:
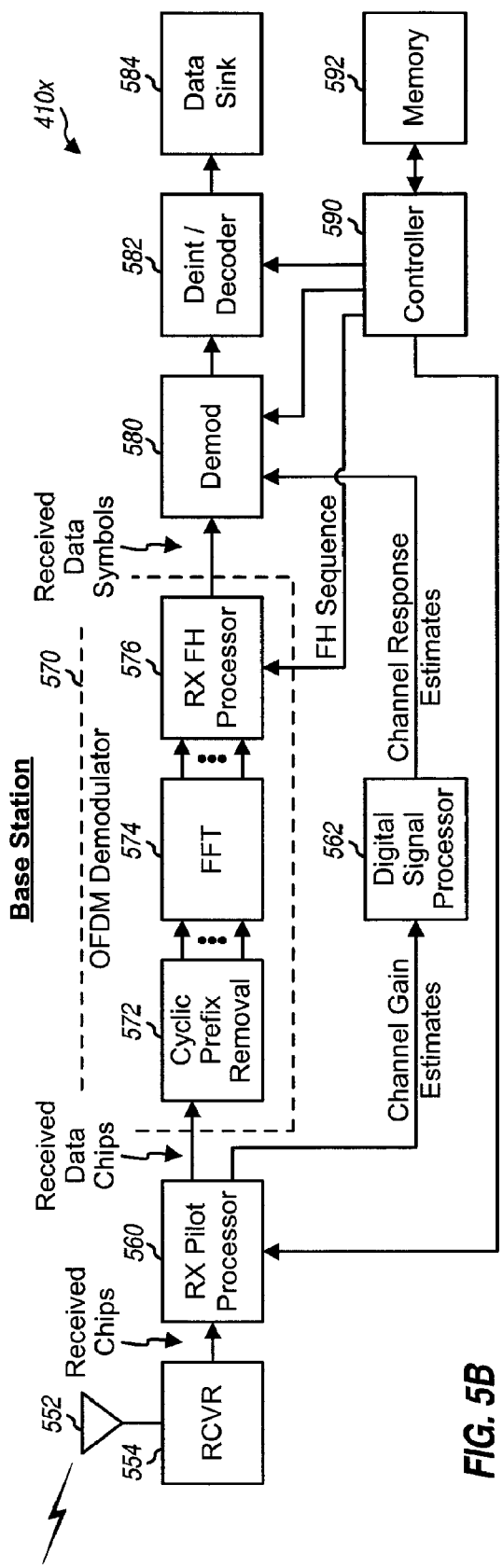

FIG. 5B shows a block diagram of an embodiment of a base station 410x, which is one of the base stations in OFDMA system 400. For simplicity, only the receiver portion of base station 410x is shown in FIG. 5B.

The modulated signal transmitted by terminal 420x is received by an antenna 552. The received signal from antenna 552 is provided to and processed by a receiver unit (RCVR) 554 to provide samples. Receiver unit 554 may further perform sample rate conversion (from the receiver sampling rate to the chip rate), frequency/phase correction, and other pre-processing on the samples. Receiver unit 554 provides a stream of "received" chips.

A receive (RX) pilot processor 560 receives and processes the stream of received chips to recover the wideband pilot and the data chips transmitted by terminal 420x. Several designs for RX pilot processor 560 are described below. RX pilot processor 560 provides a stream of received data chips to an OFDM demodulator 570 and channel gain estimates to a digital signal processor (DSP) 562. DSP 562 processes the channel gain estimates to obtain channel response estimates used for data demodulation, as described below.

Within OFDM demodulator 570, a cyclic prefix removal unit 572 receives the stream of received data chips and removes the cyclic prefix appended to each received OFDM symbol to obtain a received transformed symbol. An FFT unit 574 then transforms each received transformed symbol to the frequency domain using an N-point FFT to obtain N received symbols for the N subbands. An RX FH processor 576 obtains the N received symbols for each OFDM symbol period and provides the received symbol from the proper subband as the received data symbol for that OFDM symbol period. The specific subband from which to obtain the received data symbol in each OFDM symbol period is determined by the FH sequence for the traffic channel assigned to terminal 420x. This FH sequence is provided by a controller 590. Since the data transmission by terminal 420x dynamically hops from subband to subband, RX FH processor 576 operates in unison with TX FH processor 522 in terminal 420x and provides the received data symbols from the proper subbands. The FH sequence used by RX FH processor 576 at base station 410x is the same as the FH sequence used by TX FH processor 522 at terminal 420x. Moreover, the FH sequences at base station 410x and terminal 420x are synchronized. RX FH processor 576 provides a stream of received data symbols to a demodulator 580.

Demodulator 580 receives and coherently demodulates the received data symbols with the channel response estimates from DSP 562 to obtain recovered data symbols. The channel response estimates are for the subbands used for data transmission. Demodulator 580 further demaps the recovered data symbols to obtain demodulated data. A deinterleaver/decoder 582 then deinterleaves and decodes the demodulated data to provide decoded data, which may be provided to a data sink 584 for storage. In general, the processing by the units in base station 410x is complementary to the processing performed by the corresponding units in terminal 420x.

Controllers 540 and 590 direct operation at terminal 420x and base station 410x, respectively. Memory units 542 and 592 provide storage for program codes and data used by controllers 540 and 590, respectively. Controllers 540 and 590 may also perform pilot-related processing. For example, controllers 540 and 590 may determine the time intervals when the wideband pilot for terminal 420x should be transmitted and received, respectively.

For clarity, FIGS. 5A and 5B show transmission and reception, respectively, of pilot and data on the reverse link. Similar or different processing may be performed for pilot and data transmission on the forward link.

Figure 6A:
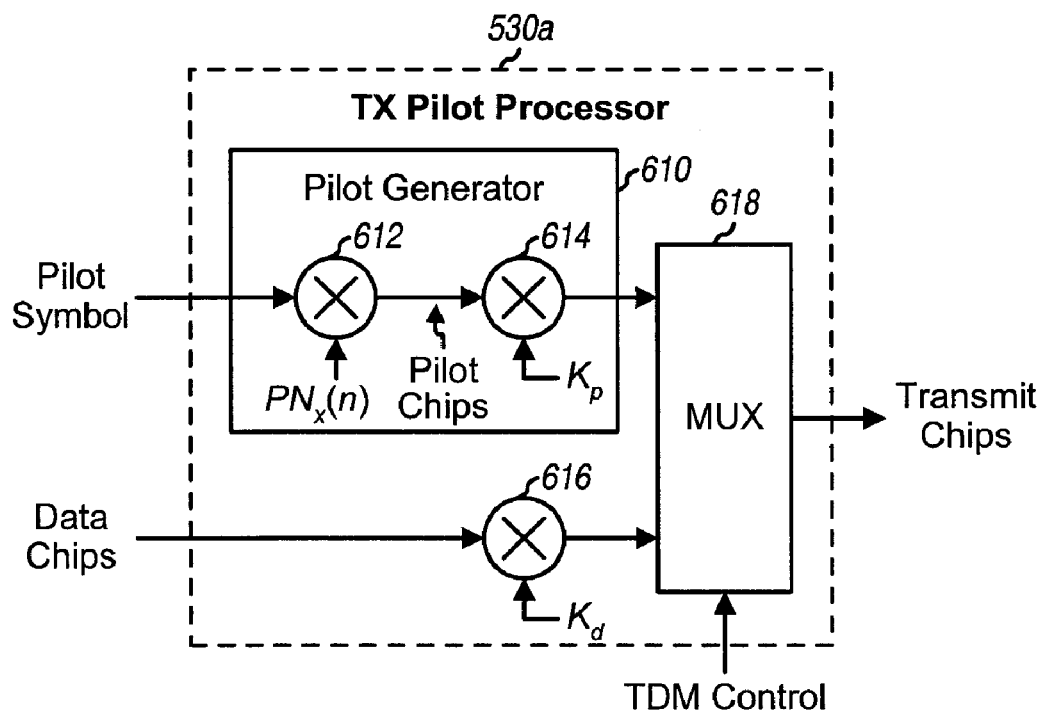
FIGS. 6A and 6B respectively show a block diagram of a transmit (TX) pilot processor and a timing diagram for the TDM/CDM pilot transmission scheme.

FIG. 6A shows a block diagram of a TX pilot processor 530a, which may be used for the TDM/CDM pilot transmission scheme. TX pilot processor 530a is one embodiment of TX pilot processor 530 in FIG. 5A and includes a pilot generator 610, a multiplier 616, and a multiplexer (MUX) 618.

Within pilot generator 610, a multiplier 612 receives and multiplies a pilot symbol with a PN code $PN_x(n)$ and provides a stream of pilot chips. The pilot symbol may be any real or complex value that is known a priori by both terminal 420x and base station 410x. The PN code $PN_x(n)$ is the one assigned to terminal 420x, where "n" is the chip index. The PN code may be expressed as $PN_x(n)=PN(n+\Delta T_x)$ for the embodiment whereby each user is assigned a different time shift $\Delta T_x$ of a common PN code $PN(n)$. A multiplier 614 receives and scales the stream of pilot chips with a scaling factor $K_p$ and provides a stream of scaled pilot chips. Multiplier 616 receives and scales the stream of data chips with a scaling factor $K_d$ and provides a stream of scaled data chips. The scaling factors $K_p$ and $K_d$ determine the transmit powers used for the wideband pilot and the data symbols, respectively. Multiplexer 618 receives and multiplexes the stream of scaled data chips with the stream of scaled pilot chips and provides the stream of transmit chips. The multiplexing is performed in accordance with a TDM control provided by controller 540.

Figure 6C:
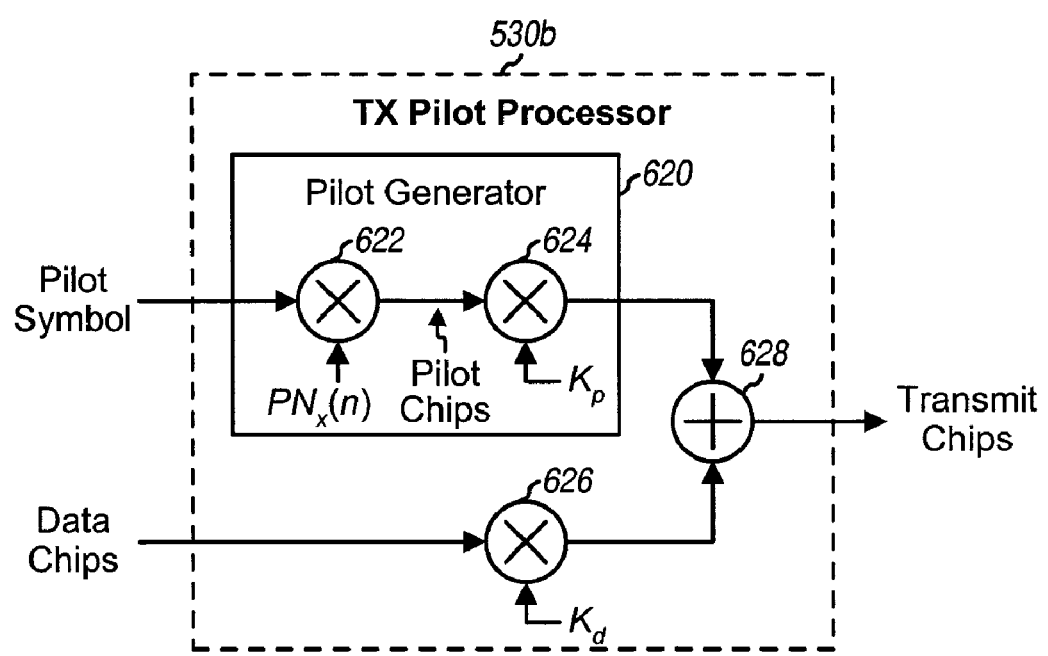
FIGS. 6C and 6D respectively show a block diagram of a TX pilot processor and a timing diagram for the continuous CDM pilot transmission scheme.
Figure 6B:
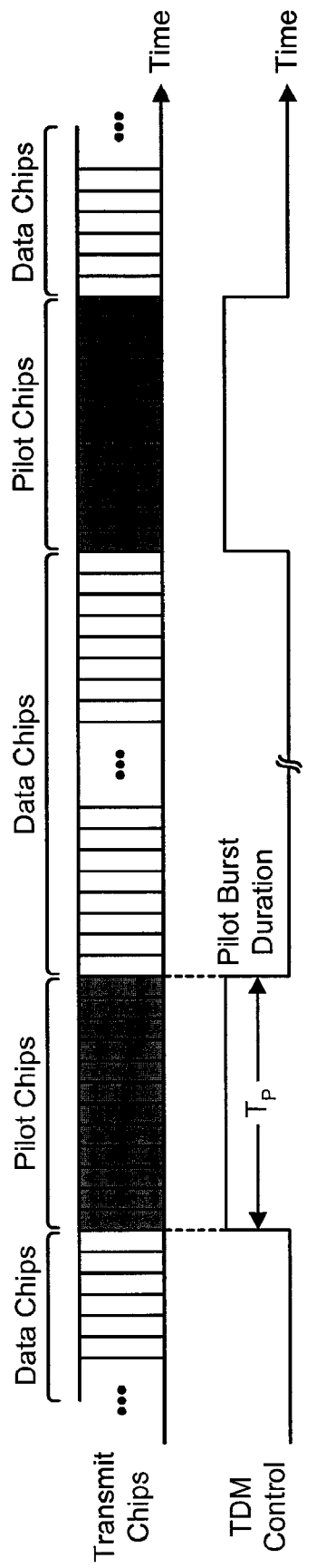

FIG. 6B shows a timing diagram for the TDM/CDM pilot transmission scheme. The transmit chips from TX pilot processor 530a are composed of data chips time division multiplexed with pilot chips. The TDM control determines when the data chips and the pilot chips are provided as the transmit chips. The length of the PN code $PN_x(n)$ may be selected to be equal to the duration of one wideband pilot burst, which is $N_p \cdot (N+C_p)$ chips. Alternatively, the PN code length may be selected to be equal to the duration of multiple OFDM symbols, the duration of multiple wideband pilot bursts, or some other duration.

FIG. 6C shows a block diagram of a TX pilot processor 530b, which may be used for the continuous CDM pilot transmission scheme. TX pilot processor 530b is another embodiment of TX pilot processor 530 in FIG. 5A and includes a pilot generator 620, a multiplier 626, and a summer 628.

Within pilot generator 620, a multiplier 622 receives and multiplies the pilot symbol with the PN code $PN_x(n)$ assigned to terminal 420x and provides a stream of pilot chips. A multiplier 624 receives and scales the stream of pilot chips with the scaling factor $K_p$ and provides the stream of scaled pilot chips. Multiplier 626 receives and scales the stream of data chips with the scaling factor $K_d$ and provides the stream of scaled data chips. Summer 628 receives and sums the stream of scaled data chips with the stream of scaled pilot chips and provides the stream of transmit chips.

Figure 6D:
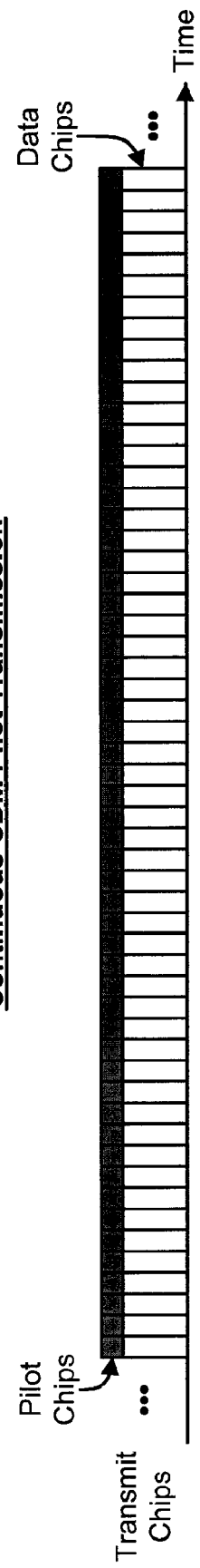

FIG. 6D shows a timing diagram for the continuous CDM pilot transmission scheme. The transmit chips from TX pilot processor 530b are composed of data chips superimposed on (i.e., added to) pilot chips. The length of the PN code $PN_x(n)$ may be selected to be equal to the duration of one OFDM symbol, which is $N+C_p$ chips. Alternatively, the PN code length may be selected to be equal to the duration of multiple OFDM symbols or some other duration.

FIGS. 6A and 6C show the generation of a wideband pilot in the time domain using direct sequence spread spectrum processing. The wideband pilot may also be generated in other manners, and this is within the scope of the invention. For example, a wideband pilot may be generated in the frequency domain. For this embodiment, a pilot symbol may be transmitted on each of the N subbands during the pilot burst for a TDM pilot transmission scheme or continuously for a continuous pilot transmission scheme. The N pilot symbols on the N subbands may be orthogonalized with an orthogonal code or a PN code to allow the base station to individually identify and recover multiple frequency-domain wideband pilots transmitted concurrently by multiple terminals.

Figure 7A:
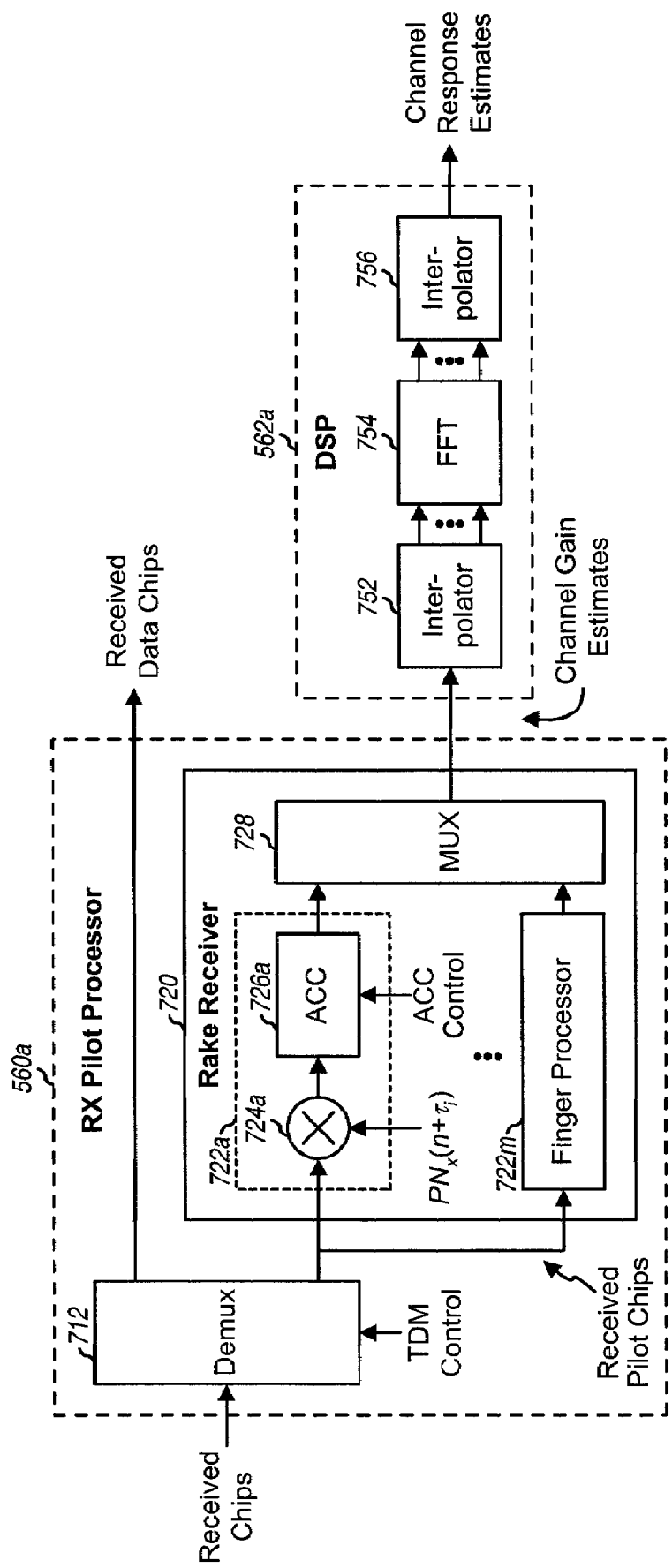
FIG. 7A shows a block diagram of a receive (RX) pilot processor for the TDM/CDM pilot transmission scheme.

FIG. 7A shows a block diagram of an RX pilot processor 560a, which may be used for the TDM/CDM pilot transmission scheme. RX pilot processor 560a is one embodiment of RX pilot processor 560 in FIG. 5B and includes a demultiplexer (Demux) 712 and a rake receiver 720.

Demultiplexer 712 receives the stream of received chips from receiver unit 554 and demultiplexes these chips in a manner complementary to the multiplexing performed by terminal 420x. The demultiplexing is performed with a TDM control provided by controller 590, as shown in FIG. 5B. Demultiplexer 712 provides received data chips to OFDM demodulator 570 and received pilot chips to rake receiver 720.

The received signal at base station 410x may include a number of instances (or multipath components) of the modulated signal transmitted by terminal 420x. Each multipath component is associated with a particular complex channel gain and a particular time of arrival at base station 410x. The channel gain and arrival time for each multipath component are determined by the propagation path for that multipath component. A searcher (not shown in FIG. 7A) searches for strong multipath components in the received signal and provides the timing of each found multipath component that is of sufficient strength. The searcher correlates the received chips with the PN code $PN_x(n)$ at various time offsets to search for strong multipath components, similar to the search processing performed in a CDMA system. A technique for searching for a non-continuous (i.e., gated) pilot is described in commonly assigned U.S. Pat. No. 6,813,478 entitled "Method and Apparatus for Searching a Gated Pilot," and issued Nov. 2, 2004.

Rake receiver 720 includes M finger processors 722a through 722m, where M>1. Each finger processor 722 may be assigned to process a different multipath component found by the searcher. Within each assigned finger processor 722, a multiplier 724 multiplies the received pilot chips with a delayed PN code $PN_x(n+\tau_i)$ and provides despread chips. The PN code $PN_x(n+\tau_i)$ is a delayed version of the PN code $PN_x(n)$ assigned to terminal 420x, where $\tau_i$ is the time offset corresponding to the arrival time of the i-th multipath component being processed by the finger processor. An accumulator (ACC) 726 then accumulates the despread chips over $N_{acc}$ chip periods and provides a channel gain estimate $G_i$ for the assigned multipath component. The accumulation interval $N_{acc}$ is determined by an ACC control and may be selected to be equal to the pilot burst duration, the PN code length, or some other time interval. (The pilot burst duration may or may not be equal to the PN code length.) The M finger processors 722a through 722m can provide up to M channel gain estimates for up to M different multipath components with different time offsets. A multiplexer 728 multiplexes the channel gain estimates from the assigned finger processors 722. The channel gain estimates from rake receiver 720 represent an unevenly-spaced time-domain channel impulse response for the communication channel for terminal 420x, where the spacing is determined by the time offsets $\tau_i$ associated with these channel gain estimates.

FIG. 7A also shows a DSP 562a, which is one embodiment of DSP 562 in FIG. 5B. Within DSP 562a, an interpolator 752 receives the channel gain estimates from rake receiver 720, performs interpolation on these unevenly-spaced channel gain estimates, and provides N chip-spaced gain values that represent an estimated channel impulse response for terminal 420x. The interpolation of the channel gain estimates are performed based on their associated time offsets $\tau_i$. The interpolation may also be performed using linear interpolation or some other interpolation technique, as is known in the art. An FFT unit 754 receives the N chip-spaced gain values from interpolator 752, performs an N-point FFT on these N gain values, and provides N frequency-domain values. These N frequency-domain values are estimates of the channel response for the N subbands of the communication channel for terminal 420x.

For the TDM/CDM pilot transmission scheme, the wideband pilot is transmitted in bursts and data symbols are transmitted between these pilot bursts, as shown in FIG. 2. FFT 754 provides the channel response estimates for each wideband pilot burst. An interpolator 756 receives and interpolates the channel response estimates from FFT 754 and provides an interpolated channel response estimate for each subband used for data transmission. Interpolator 756 may perform linear interpolation or some other type of interpolation. Demodulator 580 uses the interpolated channel response estimate to coherently demodulate the received data symbols. Alternatively, interpolator 756 may simply provide the channel response estimate obtained from the nearest pilot burst for each subband used for data transmission.

Figure 7B:
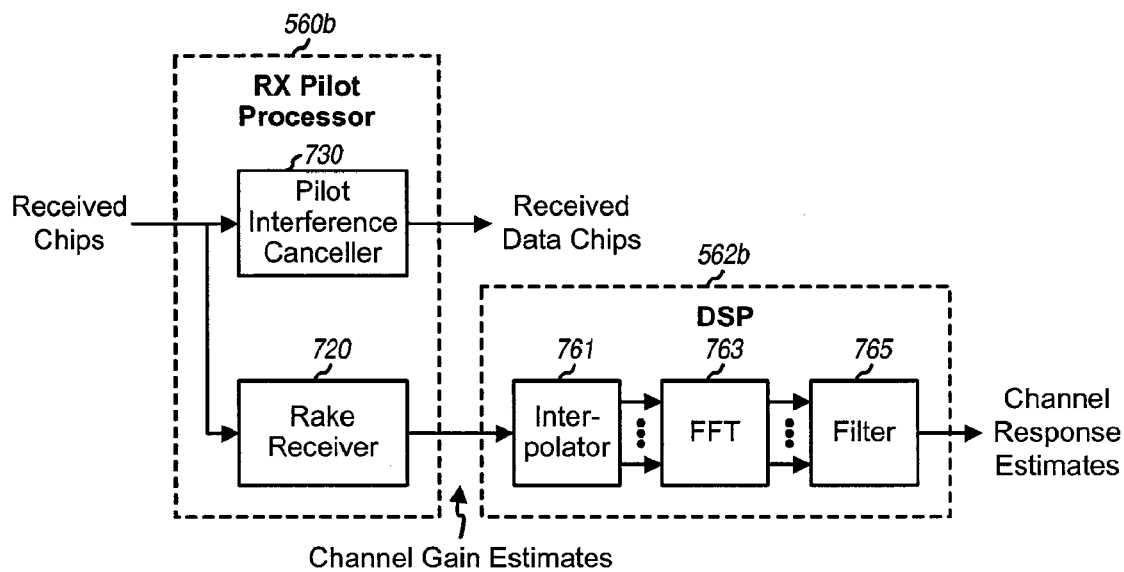
FIGS. 7B and 7C show block diagrams of an RX pilot processor and a pilot interference canceller, respectively, for the continuous CDM pilot transmission scheme.

FIG. 7B shows a block diagram of an RX pilot processor 560b, which may be used for the continuous CDM pilot transmission scheme. RX pilot processor 560b is another embodiment of RX pilot processor 560 in FIG. 5B and includes rake receiver 720 and an optional pilot interference canceller 730.

Pilot interference canceller 730 receives the stream of received chips from receiver unit 554 and processes these chips in a manner described below to provide received data chips. If pilot interference canceller 730 is not present, then the received chips may be provided directly as the received data chips. Rake receiver 720 receives and processes the received chips in the manner described above for FIG. 7A. The accumulation interval $N_{acc}$ for each accumulator 726 may be selected to be one OFDM symbol period, multiple OFDM symbol periods, the PN code length, or some other time interval. The M finger processors 722a through 722m within rake receiver 720 can provide up to M channel gain estimates for the estimated channel impulse response for terminal 420x.

A DSP 562b receives and processes the channel gain estimates from rake receiver 720 to provide channel response estimates for terminal 420x. DSP 562b includes an interpolator 761, an FFT unit 763, and a filter 765. Interpolator 761 and FFT unit 763 operate in the manner described above for interpolator 752 and FFT unit 754, respectively, in FIG. 7A. Filter 765 filters the channel response estimates and provides a filtered channel response estimate for each subband used for data transmission. Demodulator 580 uses the filtered channel response estimate to coherently demodulate the received data symbols.

Figure 7C:
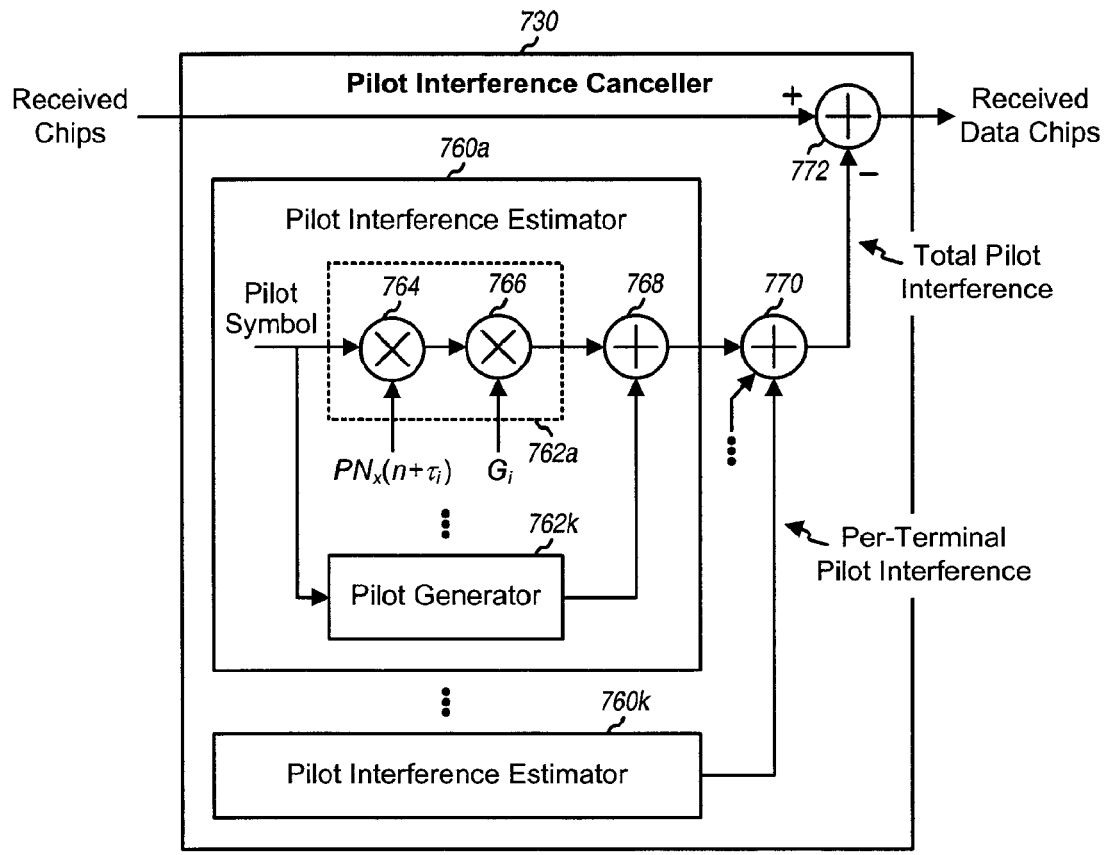

FIG. 7C shows a block diagram of an embodiment of pilot interference canceller 730 within RX pilot processor 560b. Pilot interference canceller 730 includes K pilot interference estimators 760a through 760k, where $K \geq 1$. Each pilot interference estimator 760 may be used to estimate the pilot interference due to one terminal. For clarity, the following description is for one pilot interference estimator 760x, which is used to estimate the pilot interference from terminal 420x.

Pilot interference estimator 760x includes M pilot generators 762a through 762m and a summer 768. Each pilot generator 762 may be assigned to a different multipath component being processed by rake receiver 720, i.e., one pilot generator 762 is associated with each assigned finger processor 722. The multipath component assigned to each pilot generator 762 is associated with a delayed PN code $PN_x(n+\tau_i)$ and a channel gain estimate $G_i$, which are provided by the associated finger processor 722. Within each pilot generator 762, the pilot symbol is multiplied with the delayed PN code $PN_x(n+\tau_i)$ by a multiplier 764 and further multiplied with the channel gain estimate $G_i$ by a multiplier 766 to provide pilot chip estimates for the assigned multipath component. Summer 768 then sums the pilot chip estimates from all assigned pilot processors 762 and provides the pilot interference due to terminal 420x.

A summer 770 receives and sums the pilot interference for all terminals being processed and provides the total pilot interference. A summer 772 subtracts the total pilot interference from the received chips to provide the received data chips.

FIG. 8A shows a flow diagram of a process 810 for transmitting a wideband pilot with the TDM/CDM pilot transmission scheme in a wireless multi-carrier communication system (e.g., an OFDMA system). At least one pilot symbol is processed with a PN code (e.g., in the time domain using direct sequence spread spectrum processing) to obtain a sequence of pilot chips for the wideband pilot (step 812). The PN code is used to spectrally spread the pilot symbol and to uniquely identify a transmitting entity of the wideband pilot. Data symbols are processed in accordance with a multi-carrier modulation scheme (e.g., OFDM) to obtain a sequence of data chips (step 814). If the data symbols are to be transmitted with frequency hopping, then the specific subband to use for the data symbols in each hop period is determined by an FH sequence. The sequence of pilot chips and the sequence of data chips may be scaled with two scaling factors to control the transmit powers for the wideband pilot and the data symbols. The sequence of pilot chips is time division multiplexed with the sequence of data chips to obtain a TDM sequence of pilot and data chips (step 816). The TDM sequence of pilot and data chips is further processed and transmitted (step 818).

FIG. 8B shows a flow diagram of a process 830 for transmitting a wideband pilot with the continuous CDM pilot transmission scheme in a wireless multi-carrier communication system. At least one pilot symbol is processed with a PN code to obtain a sequence of pilot chips (step 832). Data symbols are processed to obtain a sequence of data chips (step 834). Steps 832 and 834 correspond to steps 812 and 814, respectively, in FIG. 8A. The sequence of pilot chips is summed with the sequence of data chips to obtain a sequence of combined pilot and data chips (step 836). The sequence of combined pilot and data chips is further processed and transmitted (step 838).

FIG. 8C shows a flow diagram of a process 850 for receiving a wideband pilot transmitted with the TDM/CDM pilot transmission scheme in a wireless multi-carrier communication system. A sequence of received chips is obtained (step 852) and demultiplexed to obtain a sequence of received pilot chips and a sequence of received data chips (step 854). The sequence of received pilot chips is processed with a PN code (e.g., using a rake receiver) to obtain channel gain estimates for multiple propagation paths (step 856). This PN code is the one assigned to the transmitting entity whose wideband pilot is being processed. The channel gain estimates are further processed (e.g., interpolated) to obtain a sequence of chip-spaced gain values, which are then transformed to obtain channel response estimates for multiple subbands (step 858).

The sequence of received data chips is processed in accordance with a multi-carrier demodulation scheme (e.g., for OFDM) and with the channel response estimates to obtain recovered data symbols, which are estimates of the data symbols transmitted by the transmitting entity (step 860). If the data symbols were transmitted with frequency hopping, then the specific subband from which to obtain the recovered data symbols in each hop period is determined by the same FH sequence used at the transmitting entity.

FIG. 8D shows a flow diagram of a process 870 for receiving a wideband pilot transmitted with the continuous CDM pilot transmission scheme in a wireless multi-carrier communication system. A sequence of received chips that includes a sequence of combined pilot and data chips transmitted by a transmitting entity is obtained (step 872). The sequence of received chips is processed with a PN code for the transmitting entity to obtain channel gain estimates (step 874). The channel gain estimates are further processed to obtain channel response estimates for multiple subbands (step 876).

Pilot interference cancellation may be performed on the sequence of received chips to obtain a sequence of received data chips (step 878). Step 878 is optional. The pilot interference cancellation may be performed by (1) estimating the interference due to the wideband pilot (with the channel gain estimates for multiple propagation paths) and (2) canceling the estimated interference from the sequence of received chips to obtain the sequence of received data chips. Pilot interference due to multiple transmitting entities may be estimated and canceled in similar manner. The sequence of received data chips (if pilot interference cancellation is performed) or the sequence of received chips (if pilot interference cancellation is not performed) is processed in accordance with a multi-carrier demodulation scheme and with the channel response estimates to obtain recovered data symbols (step 880).

The CDM pilot transmission schemes described herein can provide various advantages for an OFDMA system. For the TDM/CDM pilot transmission scheme, a receiver can derive an estimate of the entire wideband channel with one pilot transmission. For the continuous CDM pilot transmission scheme, the receiver can derive an estimate of the entire wideband channel even while the user is transmitting data and hopping in frequency. For both pilot transmission schemes, the frequency hopping rate no longer influences the pilot overhead. Moreover, the data transmission can hop at any frequency hopping rate up to and including one hop every OFDM symbol period.

Since the wideband pilot is a CDM pilot, the OFDMA system also benefits from many of the advantages of a CDMA system. These benefits include:

Faster power control;

Soft handoff (performance is better if the base stations are synchronous); and

Better time resolution, and hence better time tracking.

The modulated signals from a number of terminals may be received concurrently by a base station. The CDM pilot for each terminal may be processed to obtain various measurements for the terminal, such as the received pilot strength, timing and frequency recovery, and so on. These measurements may be used to support power control, soft handoff, and other functions. The transmit power of each terminal is typically controlled such that its modulated signal, as received at the base station, does not occupy the entire dynamic range of certain components (e.g., the ADCs) within the receiver unit at the base station. Faster power control may be achieved with the CDM pilot since pilot processing is performed on chips instead of OFDM symbols. Faster power control may provide improved performance for all terminals. Improved time resolution may also be obtained from performing pilot processing at chip level instead of OFDM symbol level. Soft handoff may also be more easily facilitated with improved pilot signal strength measurement from the CDM pilot.

The techniques described herein may be used for a frequency hopping OFDMA system as well as other wireless multi-carrier communication systems. For example, these techniques may be used for systems that employ other multi-carrier modulation techniques such as discrete multi-tone (DMT). The CDM pilot may be used with or without frequency hopping.

The techniques described herein may be implemented by various means at the transmitter and the receiver. The pilot and data processing at the transmitter and receiver may be performed in hardware, software, or a combination thereof. For a hardware implementation, the processing units (e.g., TX pilot processor 530, RX pilot processor 560, DSP 562, and so on) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the pilot and data processing at the transmitter and receiver may be implemented with modules (e.g., procedures, functions, and so on) that perform the functions described herein. The software codes may be stored in memory units (e.g., memory units 542 and 592 in FIGS. 5A and 5B) and executed by processors (e.g., controllers 540 and 590). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of transmitting a wideband pilot in a wireless multi-carrier communication system, comprising:
    processing, by a pilot generator, at least one pilot symbol with a pseudo-random number (PN) code to obtain a sequence of pilot chips for the wideband pilot;
    processing, by a modulator, data symbols on different ones of a plurality of subbands in different time intervals as determined by a frequency hopping (FH) sequence and processing the data symbols in accordance with a multi-carrier modulation scheme to obtain a sequence of data chips;
    time division multiplexing, by a multiplexer, the sequence of pilot chips with the sequence of data chips to obtain a time division multiplexed (TDM) sequence of pilot and data chips, wherein a plurality of periods for sequences of data chips are provided between periods for sequences of pilot chips; and
    transmitting, by a transmitter, the TDM sequence of pilot and data chips, wherein a time between periods for the sequences of pilot chips comprises a period less than a coherence time for a channel through which the sequences of pilot chips are being transmitted, wherein the wireless multi-carrier communication system is an orthogonal frequency division multiple access (OFDMA) communication system, and wherein the multi-carrier modulation scheme is orthogonal frequency division multiplexing (OFDM).

2. The method of claim 1, wherein the at least one pilot symbol is spectrally spread with the PN code in time domain using direct sequence spread spectrum processing to obtain the sequence of pilot chips.

3. The method of claim 1, wherein the PN code uniquely identifies a transmitting entity of the wideband pilot.

4. The method of claim 1, further comprising:
    scaling the sequence of pilot chips with a scaling factor to obtain a sequence of scaled pilot chips, wherein the scaling factor is indicative of a transmit power level for the wideband pilot, and wherein the sequence of scaled pilot chips is time division multiplexed with the sequence of data chips.

5. The method of claim 1, wherein the TDM sequence of pilot and data chips is transmitted on a reverse link in the system.

6. An apparatus in a wireless multi-carrier communication system, comprising:
    means for processing at least one pilot symbol with a pseudo-random number (PN) code to obtain a sequence of pilot chips for a wideband pilot;
    means for processing data symbols on different ones of a plurality of subbands in different time intervals as determined by a frequency hopping (FH) sequence and means for processing data symbols in accordance with a multi-carrier modulation scheme to obtain a sequence of data chips;
    means for time division multiplexing the sequence of pilot chips with the sequence of data chips to obtain a time division multiplexed (TDM) sequence of pilot and data chips; means for providing a plurality of periods for sequences of data chips between periods for sequences of pilot chips; and
    means for transmitting the TDM sequence of pilot and data chips, wherein a time between periods for the sequences of pilot chips comprises a period less than a coherence time for a channel through which the sequences of pilot chips are to be transmitted, wherein the wireless multi-carrier communication system is an orthogonal frequency division multiple access (OFDMA) communication system, and wherein the multi-carrier modulation scheme is orthogonal frequency division multiplexing (OFDM).

7. An apparatus in a wireless multi-carrier communication system, comprising:
    a modulator operative to process data symbols on different ones of a plurality of subbands in different time intervals as determined by a frequency hopping (FH) sequence and to process the data symbols in accordance with a multi-carrier modulation scheme to obtain a sequence of data chips;
    a pilot generator operative to process at least one pilot symbol with a pseudo-random number (PN) code to obtain a sequence of pilot chips for a wideband pilot;
    a multiplexer operative to time division multiplex (TDM) the sequence of pilot chips with the sequence of data chips to obtain a TDM sequence of pilot and data chips, the multiplexer operative to provide a plurality of periods for sequences of data chips between periods for sequences of pilot chips; and
    a transmitter unit operative to process and transmit the TDM sequence of pilot and data chips,
    wherein a time between periods for the sequences of pilot chips comprises a period less than a coherence time for a channel through which the sequences of pilot chips are to be transmitted, wherein the wireless multi-carrier communication system is an orthogonal frequency division multiple access (OFDMA) communication system, and wherein the multi-carrier modulation scheme is orthogonal frequency division multiplexing (OFDM).

8. A terminal comprising the apparatus of claim 7.

9. A base station comprising the apparatus of claim 7.

10. A processor readable media for storing computer executable instructions which is executed by the computer processor operable to:

process at least one pilot symbol with a pseudo-random number (PN) code to obtain a sequence of pilot chips for a wideband pilot in a wireless multi-carrier communication system;

process data symbols on different ones of a plurality of subbands in different time intervals as determined by a frequency hopping (FH) sequence and process the data symbols in accordance with a multi-carrier modulation scheme to obtain a sequence of data chips;

time division multiplex the sequence of pilot chips with the sequence of data chips to obtain a time division multiplexed (TDM) sequence of pilot and data chips; and provide a plurality of periods for sequences of data chips between periods for sequences of pilot chips, wherein the TDM sequence of pilot and data chips is to be processed and transmitted over a communication channel in the system, and wherein a time between periods for the sequences of pilot chips comprises a period less than a coherence time for a channel through which the sequences of pilot chips are to be transmitted, wherein the wireless multi-carrier communication system is an orthogonal frequency division multiple access (OFDMA) communication system, and wherein the multi-carrier modulation scheme is orthogonal frequency division multiplexing (OFDM).

* * * * *